(12) United States Patent
Hino et al.

(10) Patent No.: US 11,496,029 B2
(45) Date of Patent: Nov. 8, 2022

(54) LAMINATED CORE, LAMINATED CORE MANUFACTURING METHOD, AND ARMATURE THAT USES A LAMINATED CORE

(71) Applicant: Mitsubishi Electric Corporation, Tokyo (JP)

(72) Inventors: Tatsuro Hino, Tokyo (JP); Akihito Mori, Tokyo (JP); Naohiko Ayukawa, Tokyo (JP); Kenichi Hirooka, Tokyo (JP); Masashi Nakamura, Tokyo (JP); Kohei Egashira, Tokyo (JP); Shinichiro Yoshida, Tokyo (JP); Daisuke Shijo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 671 days.

(21) Appl. No.: 16/321,670

(22) PCT Filed: Aug. 28, 2017

(86) PCT No.: PCT/JP2017/030792
§ 371 (c)(1),
(2) Date: Jan. 29, 2019

(87) PCT Pub. No.: WO2018/043429
PCT Pub. Date: Mar. 8, 2018

(65) Prior Publication Data
US 2021/0296975 A1    Sep. 23, 2021

(30) Foreign Application Priority Data

Sep. 1, 2016  (JP) .............................. JP2016-170794

(51) Int. Cl.
*H02K 15/10* (2006.01)
*H02K 3/34* (2006.01)

(52) U.S. Cl.
CPC ............. *H02K 15/10* (2013.01); *H02K 3/345* (2013.01)

(58) Field of Classification Search
CPC ......... H02K 15/10; H02K 3/345; H02K 15/02
See application file for complete search history.

(56) References Cited

U.S. PATENT DOCUMENTS

| 3,436,574 A | * | 4/1969 | Larsson | ................. H02K 3/325 242/118.8 |
| 4,163,912 A | * | 8/1979 | Gottung | ................... H01B 3/52 174/110 N |

(Continued)

FOREIGN PATENT DOCUMENTS

| JP | 60121936 A | 6/1985 |
| JP | 2003324869 A | 11/2003 |

(Continued)

OTHER PUBLICATIONS

International Search Report (PCT/ISA/210) dated Nov. 21, 2017, by the Japan Patent Office as the International Searching Authority for International Application No. PCT/JP2017/030792.

*Primary Examiner* — Peter Dungba Vo
*Assistant Examiner* — Jose K Abraham
(74) *Attorney, Agent, or Firm* — Buchanan Ingersoll & Rooney PC

(57) ABSTRACT

A laminated core manufacturing method according to the present invention is a manufacturing method for a laminated core including: a laminated body that is configured by laminating core strips that are made of a magnetic material, the laminated body including: a core back portion; and a tooth portion; and electrically insulating members that are disposed on two side portions of the tooth portion, wherein the laminated core manufacturing method includes a bonding step in which the insulating members are pressed onto each of the side surfaces of the tooth portion of the laminated (Continued)

body so as to integrate the laminated body and also so as to fix the insulating members to the laminated body, by means of at least one of an adhesive and a pressure-sensitive adhesive that is disposed between each of the side surfaces of the tooth portion and the insulating members.

18 Claims, 38 Drawing Sheets

(56) References Cited

U.S. PATENT DOCUMENTS

| | | | | |
|---|---|---|---|---|
| 4,226,903 | A * | 10/1980 | Gottung | H01B 3/52 428/377 |
| 6,075,304 | A * | 6/2000 | Nakatsuka | H02K 3/38 310/43 |
| 2004/0070480 | A1 * | 4/2004 | Nakashima | H01F 27/327 336/200 |
| 2004/0212269 | A1 * | 10/2004 | Decristofaro | H01F 3/02 310/216.065 |
| 2009/0195110 | A1 * | 8/2009 | Miyake | H02K 15/022 310/216.058 |
| 2012/0128988 | A1 * | 5/2012 | Yokura | B32B 27/12 428/419 |
| 2012/0256512 | A1 * | 10/2012 | Fubuki | H02K 3/345 310/215 |
| 2012/0293037 | A1 | 11/2012 | Uchida et al. | |
| 2013/0068504 | A1 * | 3/2013 | Murray | B32B 27/12 428/335 |
| 2015/0008769 | A1 * | 1/2015 | Uchitani | H02K 9/22 310/43 |
| 2015/0097462 | A1 * | 4/2015 | Fukumoto | H02K 1/22 |
| 2016/0065024 | A1 * | 3/2016 | Zhang | H02K 15/10 427/299 |
| 2016/0380521 | A1 * | 12/2016 | Tsuchiya | H02K 1/165 310/215 |
| 2018/0029329 | A1 * | 2/2018 | Hirano | C08F 20/68 |
| 2018/0358871 | A1 * | 12/2018 | Hasuo | H02K 15/022 |

FOREIGN PATENT DOCUMENTS

| | | | |
|---|---|---|---|
| JP | 2006238592 A | * | 9/2006 |
| JP | 2006238592 A | | 9/2006 |
| JP | 2008067459 A | | 3/2008 |
| JP | 2009225558 A | | 10/2009 |
| JP | 2011066987 A | | 3/2011 |
| JP | 2012244719 A | | 12/2012 |
| JP | 5357187 B2 | | 12/2013 |
| JP | 2016086565 a | | 5/2016 |
| WO | 2010082465 A1 | | 7/2010 |
| WO | 2016067506 A1 | | 5/2016 |

* cited by examiner

BENDING MOMENT

CIRCUMFERENTIAL STRESS
DUE TO PRESS-FITTING

COMPARATIVE EXAMPLE

COMPARATIVE EXAMPLE

COMPARATIVE EXAMPLE

LAMINATED CORE, LAMINATED CORE MANUFACTURING METHOD, AND ARMATURE THAT USES A LAMINATED CORE

TECHNICAL FIELD

The present invention relates to a laminated core, a laminated core manufacturing method, and an armature that uses a laminated core.

BACKGROUND ART

In recent years, there has been demand for compactness and increased output in rotary electric machines such as electric motors or generators. Aiming to increase efficiency by configuring an armature core that is used in a rotary electric machine using a laminated core that is a laminated body of electromagnetic steel sheets to suppress eddy currents that arise in the armature core is widely known. Means for fixing the laminated electromagnetic steel sheets include methods such as crimping or welding the electromagnetic steel sheets together, but because the electromagnetic steel sheets are electrically short-circuited with each other in a direction of lamination at the fixed portions, one problem has been that eddy currents arise, making efficiency poor. Because residual stresses arise in the crimped portions or the welded portions, another problem has been that hysteresis loss increases, also making the efficiency of the rotary electric machine poor.

Fixing the electromagnetic steel sheets together using adhesive is a known method for solving these problems.

In a laminated core manufacturing method that is described in Patent Literature 1, a side surface of a laminated body of electromagnetic steel sheets was fastened temporarily by applying and curing an adhesive in a state in which the laminated body was fixed by clamping, and then a thermosetting adhesive was impregnated and cured between the electromagnetic steel sheets. Alignment of the electromagnetic steel sheets was improved by fixing the laminated body temporarily using the adhesive before impregnating the adhesive between the electromagnetic steel sheets. Die release characteristics of the adhesive that adheres to the jig were improved by applying a fluorocarbon resin coating to a jig that holds the laminated body that is being fixed temporarily.

CITATION LIST

Patent Literature

Patent Literature 1: Japanese Patent Laid-Open No. 2003-324869 (Gazette)

SUMMARY OF THE INVENTION

Problem to be Solved by the Invention

However, in the laminated core manufacturing method that is described in Patent Literature 1, one problem has been that it is necessary to apply the adhesive in two steps, i.e., a temporary fastening step and an impregnating step, making productivity poor. In the temporary fastening step, one problem has been that it is difficult to apply the adhesive to a uniform thickness on the side surface of the laminated body of electromagnetic steel sheets, making adhesive strength unstable. In the impregnating step, because adhesive adheres to the jig that holds the temporarily fastened laminated body, one problem has been that a step of removing the adhesive is required, increasing manufacturing costs. Here, the adhesive that has adhered to the jig can be easily removed a few times by coating the jig with a fluorocarbon resin to increase die release characteristics of the jig. However, in practice, because the die release characteristics of the jig deteriorate when the laminated core is produced repeatedly, one problem has been that it is necessary to reapply the fluorocarbon resin frequently, making productivity poor.

In the impregnating step, the impregnated adhesive protrudes from the side surfaces of the laminated body. Thus, when placing the side surfaces of the laminated body in contact with each other, and arranging the laminated body into an annular shape to assemble the armature core, one problem has been that assembly precision cannot be stabilized due to adhesive that protrudes at the contacting surfaces of the laminated body, reducing assembly precision, and making productivity poor.

In addition, it is necessary to fill the adhesive between all of the electromagnetic steel sheets that constitute the laminated body. When consideration is given to the fact that the number of laminated electromagnetic steel sheets in a conventional laminated body that is used in a rotary electric machine, etc., can reach several hundred pieces, one problem has been that it is necessary to impregnate the adhesive between the electromagnetic steel sheets at all of several hundred positions, making productivity poor. Furthermore, irregularities are more likely to arise in the gaps between the electromagnetic steel sheets, and if there is even one position that has weak adhesive strength among several hundred positions, then strength will be deficient. Thus, one problem has been that management costs have increased in order to ensure the required adhesive strength. If adhesive strength is deficient, then the amount of adhesive must be increased, and another problem has been that adhesive adheres to equipment due to overflowing from the side surfaces of the laminated body, increasing maintenance costs.

An object of the present invention is to provide a laminated core, a laminated core manufacturing method, and an armature that uses the laminated core, that are superior in productivity and inexpensive.

Means for Solving the Problem

A laminated core manufacturing method according to the present invention is a manufacturing method for a laminated core including: a laminated body that is configured by laminating core strips that are made of a magnetic material, the laminated body including: a core back portion; and a tooth portion that protrudes radially inward from an inner circumferential surface of the core back portion; and electrically insulating members that are disposed on two side portions of the tooth portion, wherein the laminated core manufacturing method includes a bonding step in which the insulating members are pressed onto each of the side surfaces of the tooth portion of the laminated body so as to integrate the laminated body and also so as to fix the insulating members to the laminated body, by means of at least one of an adhesive and a pressure-sensitive adhesive that is disposed between each of the side surfaces of the tooth portion and the insulating members.

Effects of the Invention

According to the present invention, the electrically insulating members are pressed onto each of the side surfaces of the tooth portion of the laminated body, and the laminated body is integrated by at least one of the adhesive and the pressure-sensitive adhesive that is disposed between each of the side surfaces of the tooth portion and the insulating members. Thus, compared to conventional manufacturing methods in which core strips that constitute a laminated body are all joined to each other, the joining positions are at two positions between each of the side surfaces of the tooth portion and the electrically insulating members, improving productivity.

Because the film thickness of at least one of the adhesive and the pressure-sensitive adhesive that is disposed between each of the side surfaces of the tooth portion and the insulating members is made uniform by being pressed onto the side surfaces of the tooth portion by the electrically insulating members, irregularities in joining strength are suppressed. Management costs for ensuring required joining strength are thereby reduced.

Because at least one of the adhesive and the pressure-sensitive adhesive is pressed against the side surfaces of the tooth portion so as to have the electrically insulating members interposed, at least one of the adhesive and the pressure-sensitive adhesive will not adhere to a jig, reducing maintenance costs.

DESCRIPTION OF EMBODIMENTS

Embodiment 1

Figure 1:
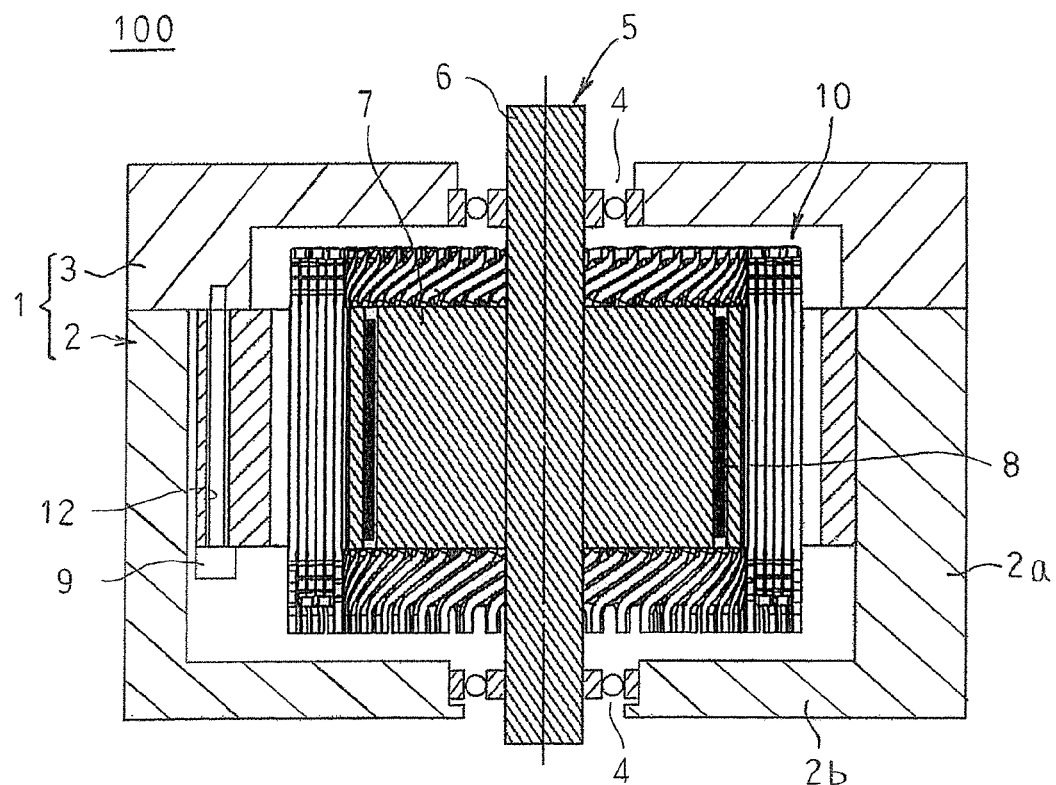
FIG. 1 is a cross section that shows a rotary electric machine according to Embodiment 1 of the present invention.
Figure 2:
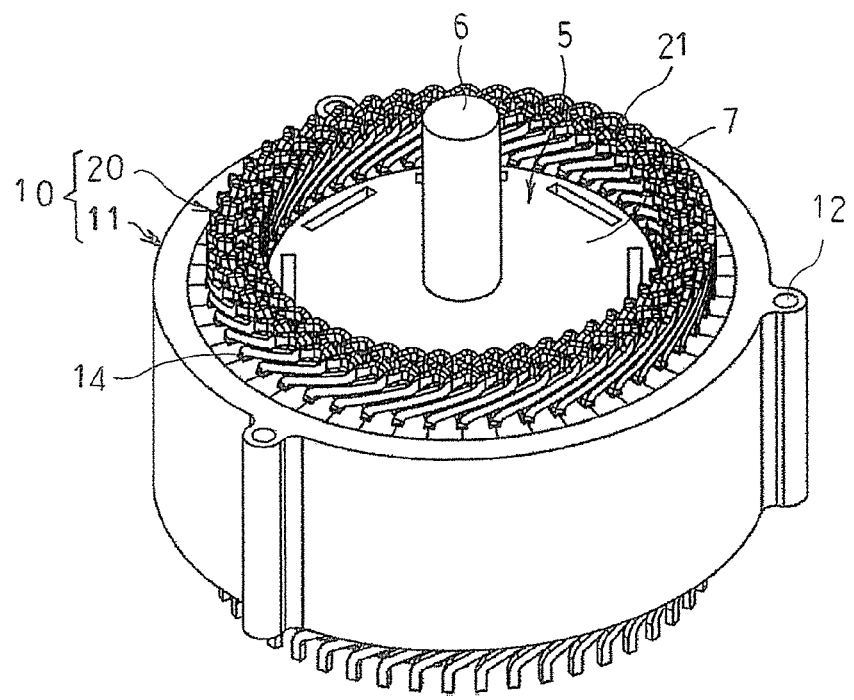
FIG. 2 is an oblique projection that shows the rotary electric machine according to Embodiment 1 of the present invention.
Figure 3:
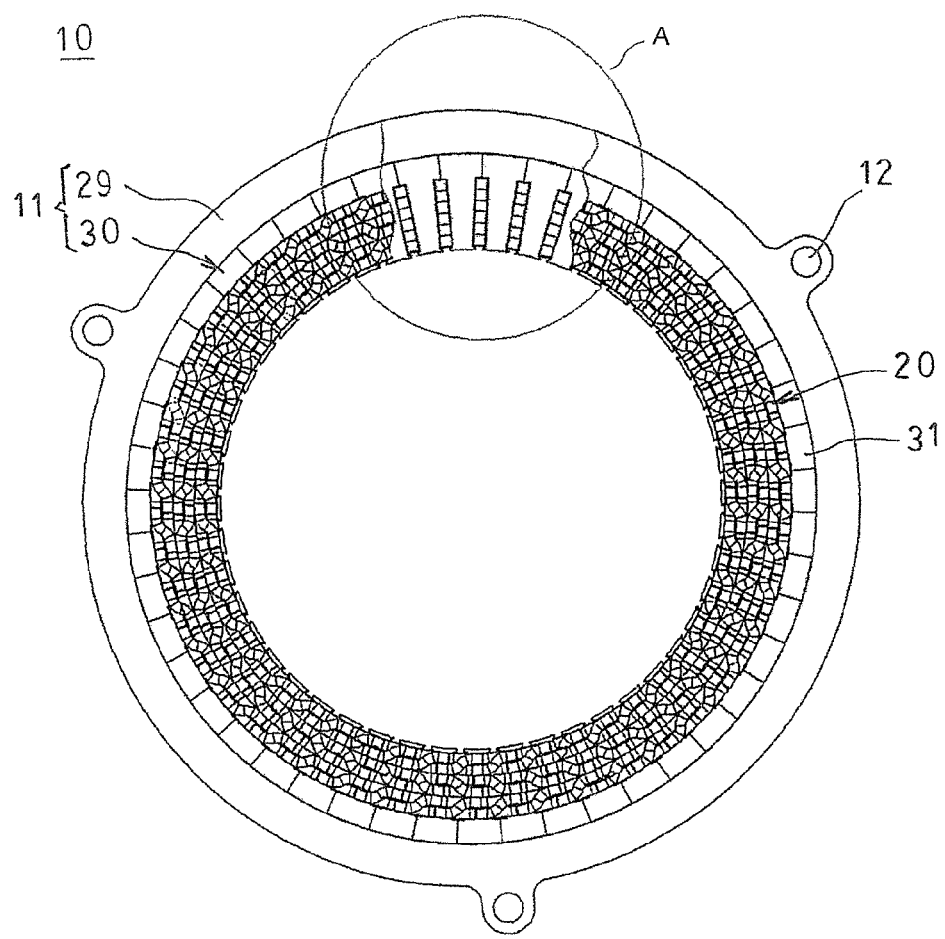
FIG. 3 is a partially cutaway end elevation that shows an armature of the rotary electric machine according to Embodiment 1 of the present invention.
Figure 4:
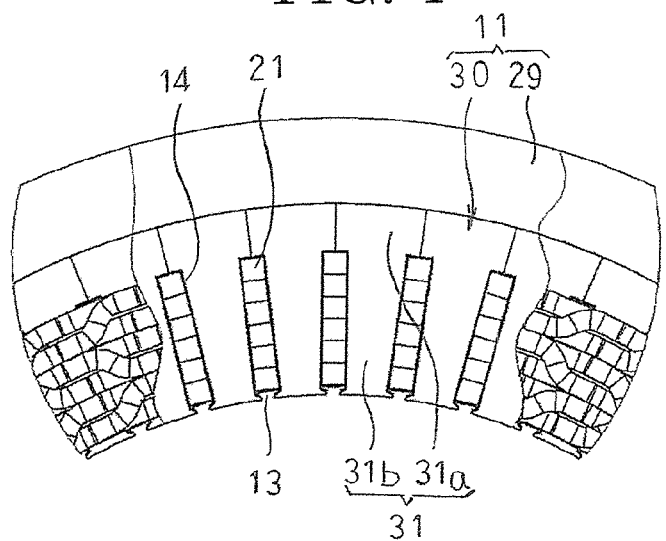
FIG. 4 is an enlargement of portion A in FIG. 3.
Figure 5:
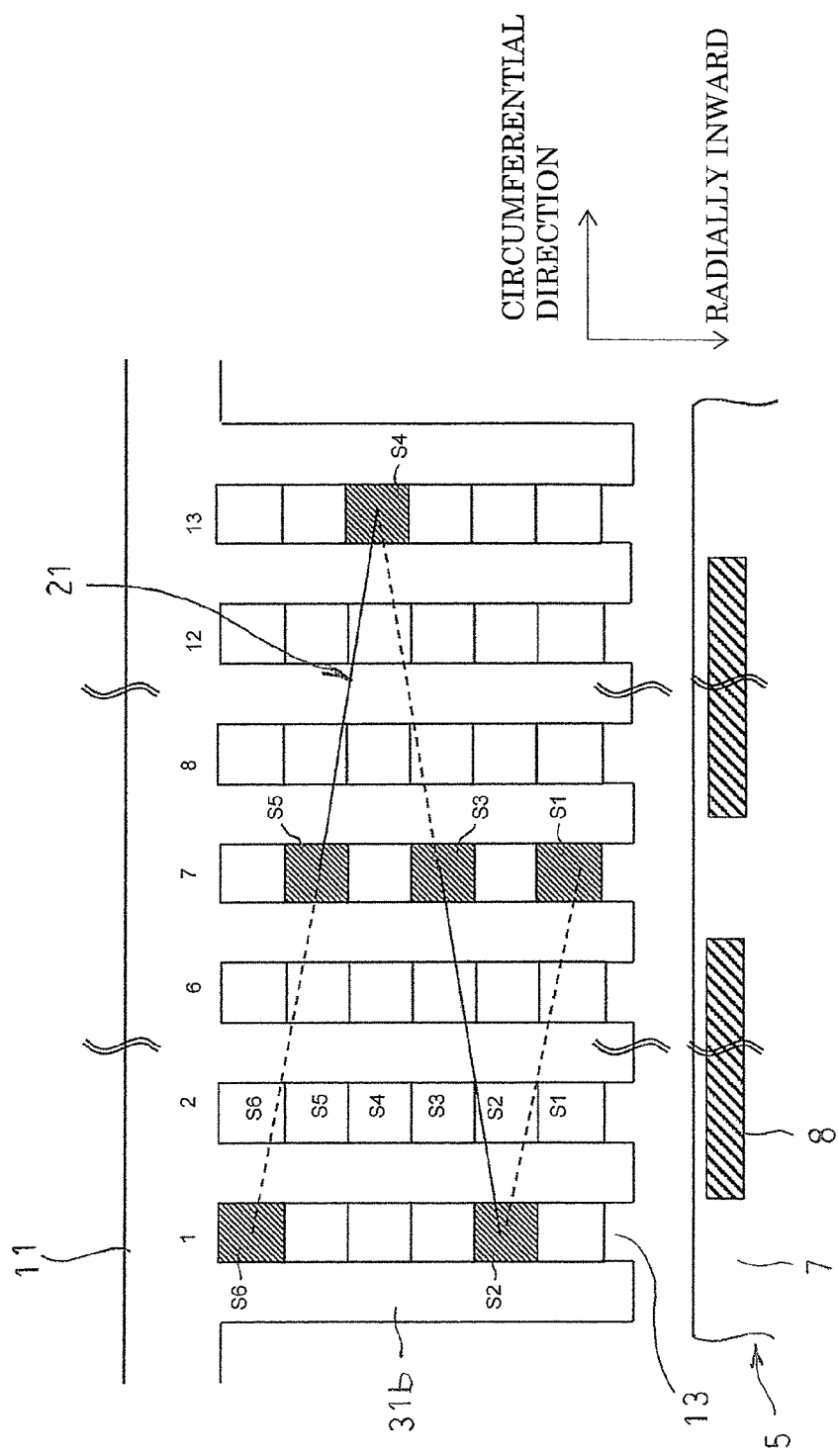
FIG. 5 is a schematic diagram that explains a mounted state of a coil that constitutes part of an armature winding in the rotary electric machine according to Embodiment 1 of the present invention.
Figure 6:
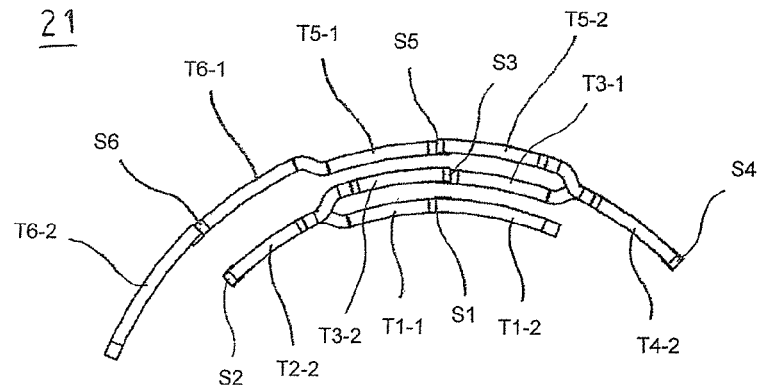
FIG. 6 is an end elevation that shows the coil that constitutes part of the armature winding in the rotary electric machine according to Embodiment 1 of the present invention when viewed from axially outside.
Figure 7:
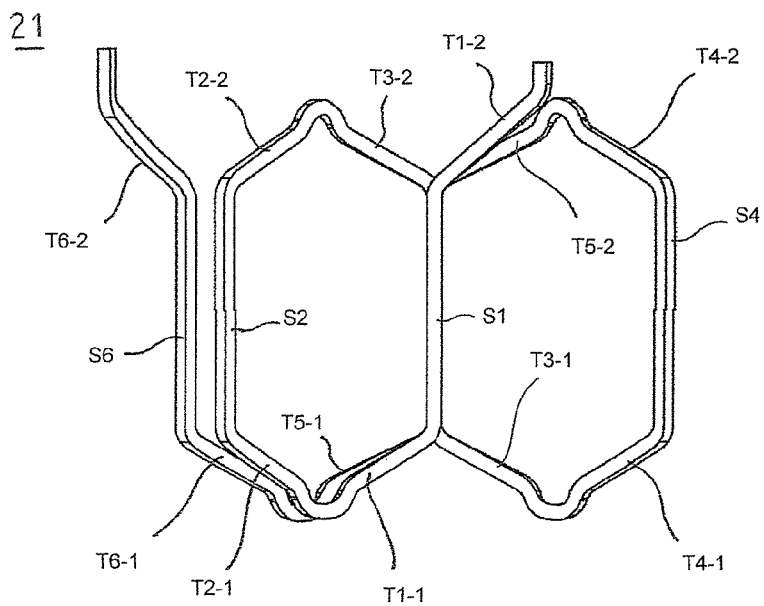
FIG. 7 is a front elevation that shows the coil that constitutes part of the armature winding in the rotary electric machine according to Embodiment 1 of the present invention when viewed from radially inside.
Figure 8:
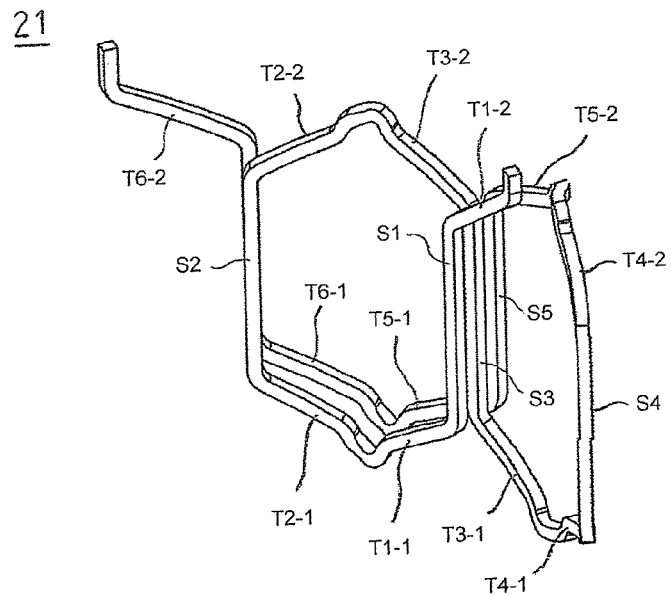
FIG. 8 is an oblique projection that shows the coil that constitutes part of the armature winding in the rotary electric machine according to Embodiment 1 of the present invention.

FIG. 1 is a cross section that shows a rotary electric machine according to Embodiment 1 of the present invention, FIG. 2 is an oblique projection that shows the rotary electric machine according to Embodiment 1 of the present invention, FIG. 3 is a partially cutaway end elevation that shows an armature of the rotary electric machine according to Embodiment 1 of the present invention, FIG. 4 is an enlargement of portion A in FIG. 3, FIG. 5 is a schematic diagram that explains a mounted state of a coil that constitutes part of an armature winding in the rotary electric machine according to Embodiment 1 of the present invention, FIG. 6 is an end elevation that shows the coil that constitutes part of the armature winding in the rotary electric machine according to Embodiment 1 of the present invention when viewed from axially outside, FIG. 7 is a front elevation that shows the coil that constitutes part of the armature winding in the rotary electric machine according to Embodiment 1 of the present invention when viewed from radially inside, and FIG. 8 is an oblique projection that shows the coil that constitutes part of the armature winding in the rotary electric machine according to Embodiment 1 of the present invention. Moreover, for simplicity, a housing has been omitted in FIG. 2. Furthermore, a direction that is parallel to an axial center of a rotating shaft shall be designated an axial direction (corresponding to up and down in FIG. 1), a direction that is perpendicular to the axial center of the rotating shaft shall be designated a radial direction (corresponding to left and right in FIG. 1), and a direction of rotation around the rotating shaft shall be designated a circumferential direction.

In FIG. 1, a rotary electric machine 100 includes: a housing 1 that has: a floored cylindrical frame 2 in which an opening at a first end of a cylindrical portion 2a is closed by a floor portion 2b; a bracket 3 that closes an opening of the frame 2; an armature 10 that is fixed by being fastened to the bracket 3 by bolts 9, and that is housed inside the cylindrical portion 2a of the frame 2; a rotating shaft 6 that is rotatably supported at central axial positions of the floor portion of the frame 2 and the bracket 3 by means of bearings 4; and a rotor 5 that is fixed to the rotating shaft 6 so as to be rotatably disposed on an inner circumferential side of the armature 10.

The rotor 5 is a permanent-magnet rotor that includes: a rotor core 7 that is fixed to the rotating shaft 6, which is inserted through a central position thereof; and a plurality of permanent magnets 8 that are each embedded in a vicinity of an outer circumferential surface of the rotor core 7 so as to be arranged at a set pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the armature 10 will be explained in detail with reference to FIGS. 2 through 8.

As shown in FIG. 2, the armature 10 includes: an armature core 11; an armature winding 20 that is mounted to the armature core 11; and electrically insulating members 14 that electrically isolate the armature winding 20 and the armature core 11. The armature winding 20 is constituted by a plurality of coils 21. Here, to facilitate explanation, the number of poles in the rotor 5 is eight poles, the number of slots in the armature core 11 is forty-eight, and the armature winding 20 is a three-phase winding. In other words, the slots are formed on the armature core 11 at a ratio of two slots per phase per pole.

As shown in FIGS. 3 and 4, the armature core 11 includes: an annular outer core 29; and an inner core 30 that is housed on an inner circumferential side of the outer core 29. Mounting apertures 12 through which the bolts 9 are passed are formed on the outer core 29 so as to have an aperture direction in the axial direction. The inner core 30 includes forty-eight core segments 31. The core segments 31 are each configured so as to have a T shape that is constituted by: a circular arc-shaped core back portion 31a; and a tooth portion 31b that protrudes radially inward from a central portion in a circumferential direction of the inner circumferential wall surface of the core back portion 31a. The forty-eight core segments 31 are arranged into an annular shape such that the side surfaces of the core back portions 31a are butted against each other, and are housed and held inside the outer core 29 by press-fitting, shrink-fitting, etc. The forty-eight core segments 31 are arranged into an annular shape to constitute the inner core 30. Regions that are surrounded by the core back portions 31a and the circumferentially adjacent tooth portions 31b constitute slots 13. The electrically insulating members 14 are housed inside the slots 13, and electrically insulate the coils 21 from the inner core 30, in other words, the coils 21 from the armature core 11.

The core segments 31 are produced by laminating a set number of electromagnetic steel sheets. The outer core 29 is produced by laminating a set number of electromagnetic steel sheets, but the outer core 29 may alternatively be produced so as to have a ring shape using a solid body. The outer core 29 should at least be able to fix and hold the inner core 30, and it is not limited to a magnetic material and may be produced using a nonmagnetic material such as aluminum, etc.

As described below, the armature winding 20 is constituted by forty-eight coils 21. As shown in FIG. 7, the coils 21 are distributed winding coils that are configured into a shape in which a conductor wire is wound in a figure of eight when viewed radially, the conductor wire being made of jointless continuous copper wire or aluminum wire that is insulated using an enamel resin, for example. As shown in FIGS. 6 through 8, the coils 21 are constituted by: slot portions S1 through S6 that are housed in the slots 13; and return portions T1-1 through T6-1 and T1-2 through T6-2 that link together, outside the slots 13, slot portions S1 through S6 that are housed in different slots 13.

Configuration of the coils 21 will now be explained in detail using FIG. 5. In FIGS. 5, 1, 2, 6, 7, 8, 12, and 13 are numbers that are allotted to the slots 13 in circumferential order, and radial positions of the six slot portions S1 through S6 that are housed in the slots 13 will be designated a first layer, a second layer, etc., through a sixth layer from a radially inner side.

Of the slot portions S1 through S6 of the coils 21, the slot portion S1 is housed in the first layer of the slot 13 at Number 7, the slot portion S2 is housed in the second layer of the slot 13 at Number 1, the slot portion S3 is housed in the third layer of the slot 13 at Number 7, the slot portion S4 is housed in the fourth layer of the slot 13 at Number 13, the slot portion S5 is housed in the fifth layer of the slot 13 at Number 7, and the slot portion S6 is housed in the sixth layer of the slot 13 at Number 1. The slot portions S1 and S2 are linked by the return portions T1-1 and T2-1 at a second axial end of the armature core 11. The slot portions S2 and S3 are linked by the return portions T2-2 and T3-2 at a first axial end of the armature core 11. The slot portions S3 and S4 are linked by the return portions T3-1 and T4-1 at the second axial end of the armature core 11. The slot portions S4 and S5 are linked by the return portions T4-2 and T5-2 at the first axial end of the armature core 11. The slot portions S5 and S6 are linked by the return portions T5-1 and T6-1 at the second axial end of the armature core 11. The return portion T1-2 protrudes at the first axial end of the armature core 11 from the slot portion S1. In addition, the return portion T6-2 protrudes at the first axial end of the armature core 11 from the slot portion S6.

In this manner, pairs of slot portions S1 through S6 of the coils 21 are housed in pairs of slots 13 that are separated by a pitch of one magnetic pole (by an amount equal to six slots in the present embodiment) in the circumferential direction. The coils 21 are arranged circumferentially at a pitch of one slot. Thus, in each of the slots 13, six slot portions S1 through S6 from three different coils 21 are housed so as to line up neatly in a single column in a radial direction. Specifically, if, for convenience, the three different coils 21 are designated a first coil, a second coil, and a third coil, then the slot portions S1, S3, and S5 of the first coil, the slot portion S4 of the second coil, and the slot portions S2 and S6 of the third coil are housed so as to line up in a single column sequentially in order of S1, S2, etc., through S6 from a radially inner side inside an identical slot 13. The return portions T1-2 and T6-2 of the coils 21 are connected by a joining means such as welding, etc., to the return portions T1-2 and T6-2 of other coils 21, a neutral point, or electric power supplying portions.

Figure 9:
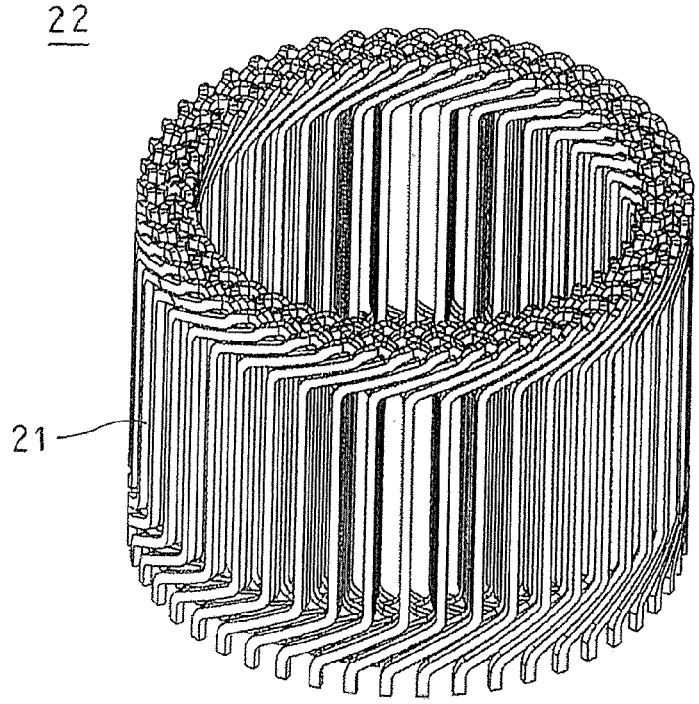
FIG. 9 is an oblique projection that shows a winding assembly in the rotary electric machine according to Embodiment 1 of the present invention.
Figure 10:
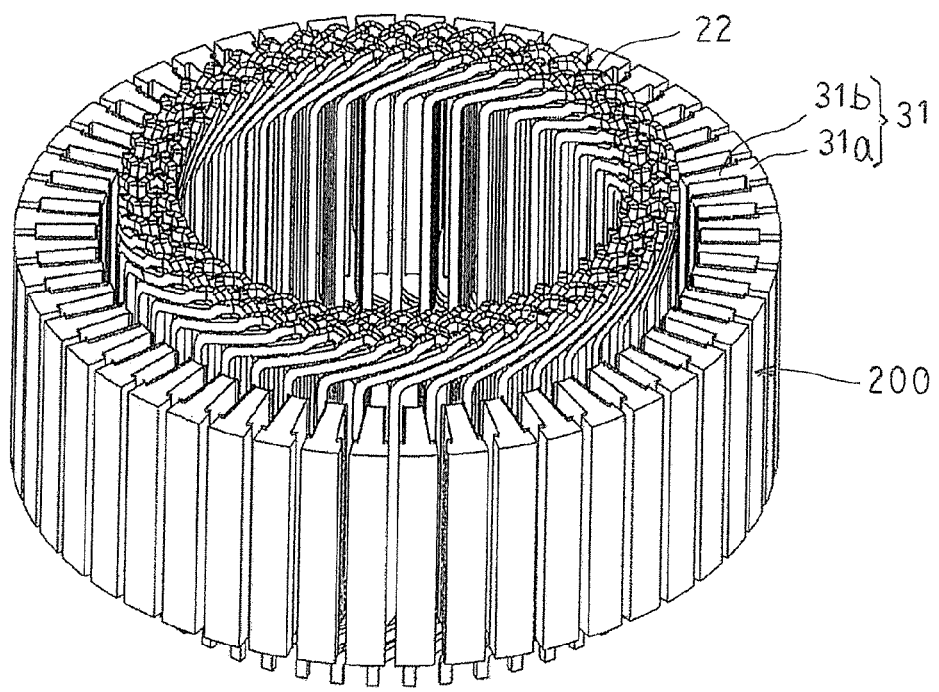
FIG. 10 is an oblique projection that explains a step of mounting laminated cores into the winding assembly in the rotary electric machine according to Embodiment 1 of the present invention.
Figure 11:
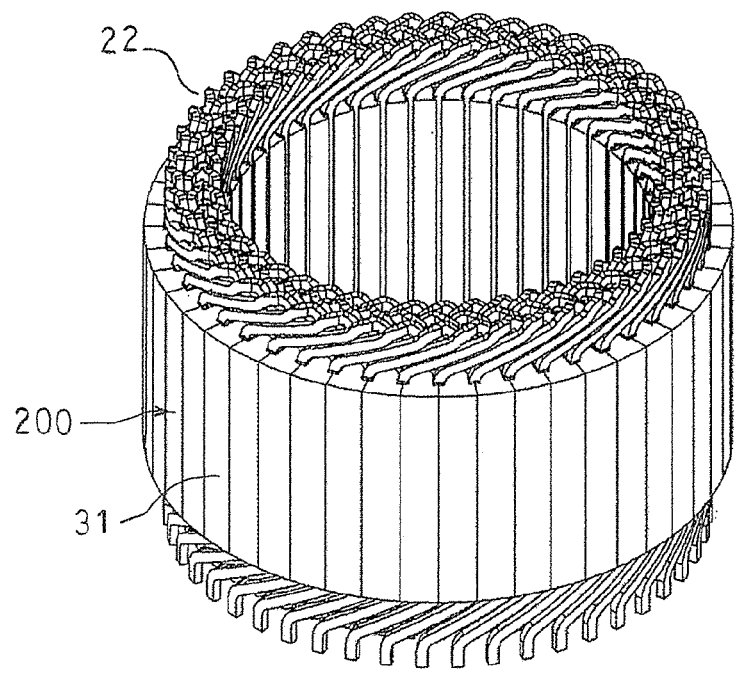
FIG. 11 is an oblique projection that shows a mounted state of laminated cores in the winding assembly in the rotary electric machine according to Embodiment 1 of the present invention.
Figure 12:
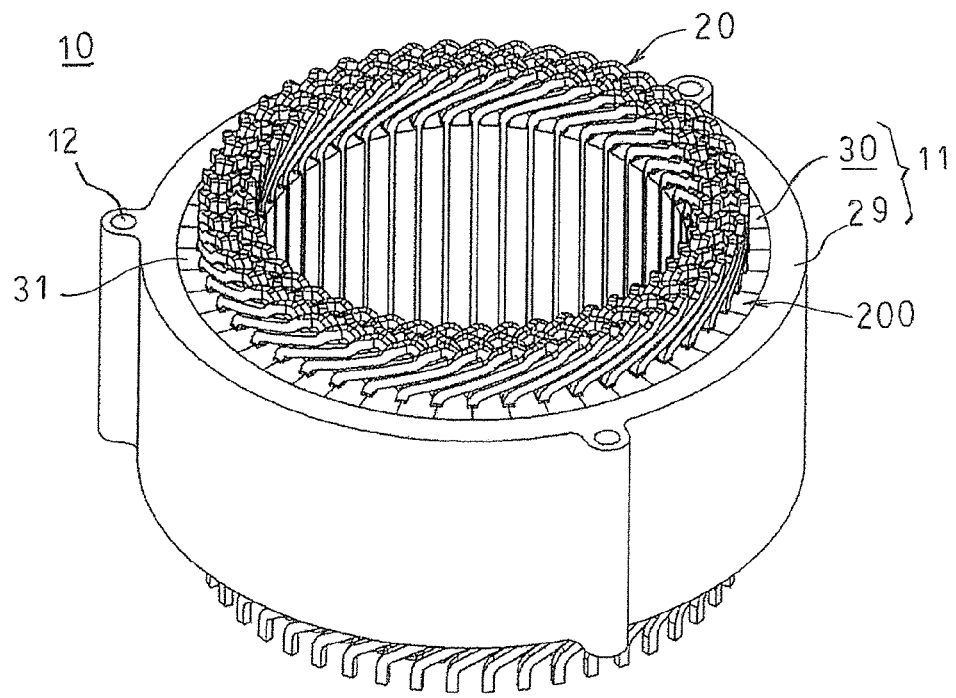
FIG. 12 is an oblique projection that shows a state in which the laminated cores that are mounted into the winding assembly in the rotary electric machine according to Embodiment 1 of the present invention are mounted into an outer circumferential core.

Next, a method for assembling the armature 10 will be explained using FIG. 9 through 12. FIG. 9 is an oblique projection that shows a winding assembly in the rotary electric machine according to Embodiment 1 of the present invention, FIG. 10 is an oblique projection that explains a step of mounting laminated cores into the winding assembly in the rotary electric machine according to Embodiment 1 of the present invention, FIG. 11 is an oblique projection that shows a mounted state of laminated cores in the winding assembly in the rotary electric machine according to Embodiment 1 of the present invention, and FIG. 12 is an oblique projection that shows a state in which the laminated cores that are mounted into the winding assembly in the rotary electric machine according to Embodiment 1 of the present invention are mounted into an outer circumferential core.

To assemble the armature 10, forty-eight coils 21 are first arranged into an annular shape at a pitch of one slot to assemble a basket-shaped winding assembly 22, which is shown in FIG. 9. In the winding assembly 22 that is assembled in this manner, forty-eight slot portion columns that are each constituted by lining up six slot portions S1 through S6 in a single column in a radial direction are arranged circumferentially at a pitch of one slot.

Next, as described below, the electrically insulating members 14 are mounted to two circumferential side surfaces of the tooth portions 31b of the core segments 31 using an adhesive 17 that functions as a bonding agent, to produce laminated cores 200. Next, as shown in FIG. 10, forty-eight laminated cores 200 are arranged into an annular shape circumferentially outside the winding assembly 22. The tooth portions 31b of the respective laminated cores 200 are positioned on a radially outer side such that the tooth portions 31b point radially inward at spaces between the slot portion columns. Here, a diameter of the winding assembly 22 is expanded, such that the spaces between adjacent slot portion columns are widened.

Next, the forty-eight laminated cores 200 are moved simultaneously radially inward to insert the tooth portions 31b between the adjacent slot portion columns. The diameter of the winding assembly 22 is reduced together with the radially inward movement of the laminated cores 200. Then, the circumferential side surfaces of the core back portions 31a of the laminated cores 200 are butted together such that the laminated cores 200 are mounted into the winding assembly 22, as shown in FIG. 11. An annular inner core 30 is formed by butting together the circumferential side surfaces of the core back portions 31a of the forty-eight laminated cores 200. The winding assembly 22 is thereby mounted to the inner core 30. Next, the inner core 30 to which the winding assembly 22 has been mounted is inserted inside the outer core 29 by press-fitting, shrink-fitting, etc.

Next, the return portions T1-2 and T6-2 of the coils 21 are connected by a joining means such as welding, etc., to the return portions T1-2 and T6-2 of other coils 21, a neutral point, or electric power supplying portions, to configure the armature winding 20. As shown in FIG. 12, the armature 10, in which the inner core 30 is held inside the outer core 29 in a fixed state, is thereby assembled.

Figure 13:
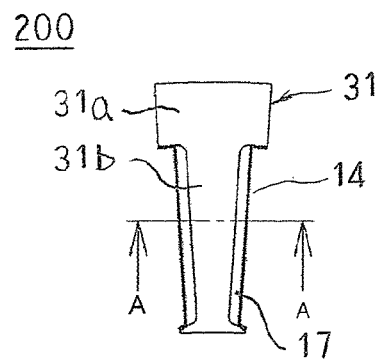
FIG. 13 is an end elevation that shows a laminated core in the rotary electric machine according to Embodiment 1 of the present invention when viewed from axially outside.
Figure 14:
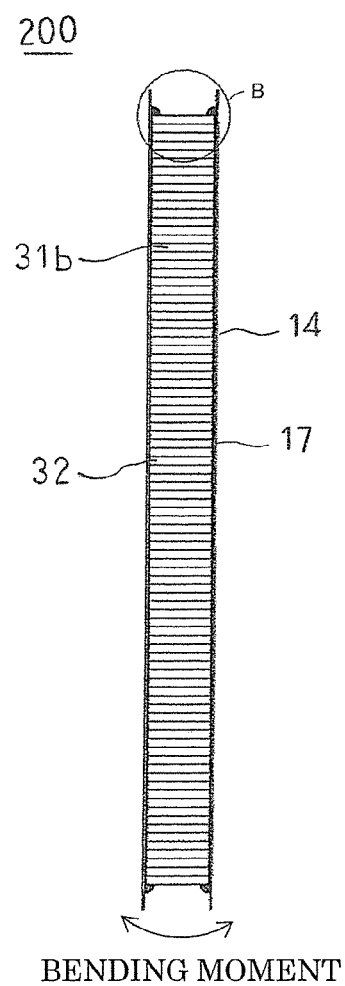
FIG. 14 is a cross section that is taken along A-A in FIG. 13 so as to be viewed in the direction of the arrows.
Figure 15:
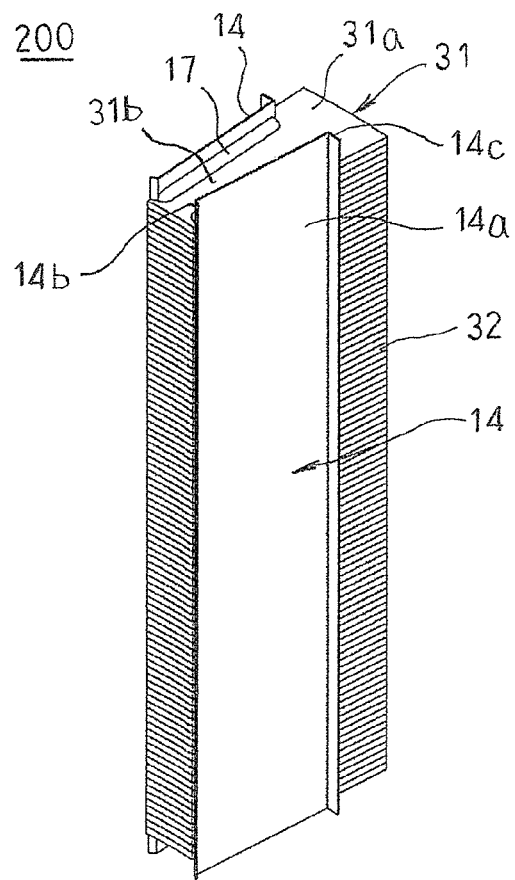
FIG. 15 is an oblique projection that shows a laminated core in the rotary electric machine according to Embodiment 1 of the present invention.

Next, configuration of the core segments 31 will be explained in detail using FIGS. 13 through 16. FIG. 13 is an end elevation that shows a laminated core in the rotary electric machine according to Embodiment 1 of the present invention when viewed from axially outside, FIG. 14 is a cross section that is taken along A-A in FIG. 13 so as to be viewed in the direction of the arrows, FIG. 15 is an oblique projection that shows a laminated core in the rotary electric machine according to Embodiment 1 of the present invention, and FIG. 16 is an enlargement of portion B in FIG. 14.

The core segment 31 is a laminated body of T-shaped core strips 32 that are punched out of a hoop material that is a strip-shaped body of electromagnetic steel sheet, for example. The core segment 31 is configured so as to have a T shape that is constituted by: a circular arc-shaped core back portion 31a; and a tooth portion 31b that protrudes radially inward from a central portion in a circumferential direction of the inner circumferential surface of the core back portion 31a. The electrically insulating members 14 are produced into U shapes by folding two edges in the width direction of a rectangular sheet material in an identical direction, a length of thereof being longer than an axial length of the tooth portion 31b, and a width thereof being wider than a radial width of side surfaces of the tooth portion 31b that face in the circumferential direction. As shown in FIGS. 13 through 15, the electrically insulating members 14 are disposed on two circumferential sides of the tooth portion 31b. Here, rectangular base portions 14a of the electrically insulating members 14 are disposed so as to lie alongside two side surfaces of the tooth portion 31b. Folded portions 14b and 14c of the electrically insulating members 14 are disposed so as to lie alongside surfaces of a flange portion near a tip of the tooth portion 31b that face radially outward and surfaces of the core back portion 31a that face radially inward. In addition, two longitudinal end portions of the electrically insulating members 14 protrude at two axial ends of the tooth portion 31b. The electrically insulating members 14 are fixed to the two side surfaces of the tooth portion 31b by the adhesive 17 to produce a laminated core 200.

Figure 16:
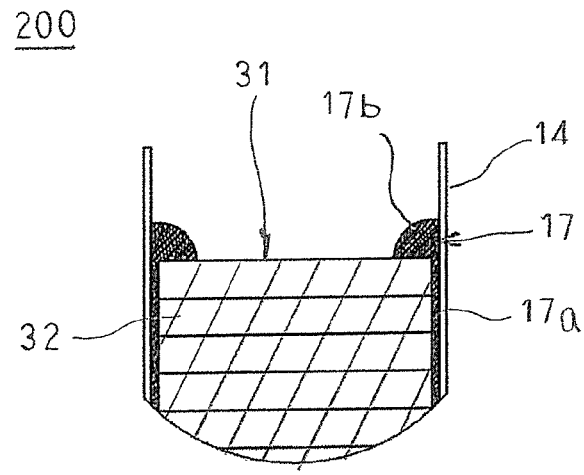
FIG. 16 is an enlargement of portion B in FIG. 14.

As shown in FIG. 16, the adhesive 17 is filled between the tooth portion 31b and the electrically insulating members 14, and protrudes at two circumferential edge portions of two axial end surfaces of the tooth portion 31b. Here, the portions of the adhesive 17 that are filled and cured between the tooth portion 31b and the electrically insulating members 14 are adhesive base portions 17a that function as bonding agent base portions, and the portions of the adhesive 17 that protrude and are cured at the two circumferential edge portions on the two axial end surfaces of the tooth portion 31b form hook portions 17b. The laminated core strips 32 are fixed and integrated by the adhesive base portion 17a.

Disengagement of the core strips 32 in the direction of lamination is stopped by the hook portions 17b.

Here, a material that has superior electrical insulation and that also has superior thermal conductivity, such as polyimide (PI), polyethylene terephthalate (PET), polyphenylene sulfide (PPS), for example, is desirable as the material for the electrically insulating members 14. Because a thickness of the electrically insulating members 14 can be made thinner by using a material that has superior electrical insulation, space for coil mounting can be increased inside the slots 13. Coil cross-sectional area can thereby be increased, resulting in increases in efficiency. Since heat-radiating characteristics from the coils 21 to the core segments 31 is improved by using a material that has superior thermal conductivity, increases in output result. Electrically insulating members 14 that have a thickness of approximately 0.1 through 0.3 mm are generally used, but any thickness can be set depending on electrical insulation specifications that are demanded by the armature 10.

Two-liquid curing adhesives, for example, may be used as the adhesive 17. A two-liquid curing adhesive includes a base resin and a hardening accelerator, and an epoxy adhesive, or an acrylic adhesive, etc., can be used as the base resin. If a two-liquid curing adhesive is used, then it is desirable for a first of the base resin and the hardening accelerator to be applied to the core segments 31, and a second to be applied to the electrically insulating members 14. By adopting a configuration of this kind, even if manufacturing apparatuses are stopped, the base resin will not harden until the electrically insulating members 14 are affixed to the core segments 31. Because of that, if a configuration of this kind is adopted, then the risk of the base resin curing before the two are stuck together is eliminated, compared to when the base resin and the hardening accelerator are applied after mixing in advance, and dummy coating, etc., of the adhesive is not required, effectively enabling material yield to be improved. If a configuration of this kind is adopted, then energy is also effectively saved since there is no thermal process.

Anaerobic adhesives, for example, of which acrylic adhesives are representative, may be used as the adhesive 17. By adopting a configuration of this kind, even if manufacturing apparatuses are stopped, the adhesive will not harden until the electrically insulating members 14 are affixed to the core segments 31. Because of that, if a configuration of this kind is adopted, then the risk of the adhesive curing before the two are stuck together is eliminated, compared to when the base resin and the hardening accelerator are applied after mixing in advance, and dummy coating, etc., of the adhesive is not required, effectively improving material yield. If a configuration of this kind is adopted, then energy is also effectively saved since there is no thermal process.

Thermosetting adhesives, for example, of which epoxy adhesives are representative, may be used as the adhesive 17. By adopting a configuration of this kind, in the rare possibility that the adhesive were to adhere to manufacturing equipment, it would not harden until heat was applied. Because of that, if a configuration of this kind is adopted, then adhesive that has adhered to the manufacturing apparatus can be removed simply by wiping, effectively improving maintainability. Furthermore, since heat tolerance thresholds of thermosetting adhesives can be increased compared to room temperature setting adhesives, heat resistance is effectively improved. Furthermore, a thermosetting adhesive may be impregnated into or coated onto the electrically insulating members 14 in advance. In that case, since a step of applying the adhesive is not required, productivity is effectively improved.

Thermoplastic resins, of which polypropylene, ethylene-vinyl acetate copolymer resins, etc., are representative, may be used as the adhesive 17. If thermoplastic resins are used, the adhesive is applied to the core segments 31 or to the electrically insulating members 14 in a heated state greater than or equal to a softening temperature, and the adhesive is cured in a state in which the electrically insulating members 14 are affixed to the core segments 31. If thermoplastic resins are used, since the adhesive hardens as soon as it cools, curing time is fast, effectively improving productivity.

Moreover, if a high-viscosity adhesive 17 is used, then the quantity of adhesive 17 applied can be reduced since the adhesive 17 is less likely to impregnate between the core strips 32, effectively saving materials. Furthermore, by disposing portions that are not filled with the adhesive 17, in other words, by forming air gap portions in the adhesive base portion 17a, rigidity of the core segments 31 can be reduced.

A second adhesive that has a lower viscosity than the adhesive 17 may be used in combination with the adhesive 17. By adjusting the viscosity of the second adhesive to a viscosity that can impregnate between surfaces of the core strips 32 that face each other in the direction of lamination, the second adhesive can be impregnated between the surfaces of the core strips 32 that face each other in the direction of lamination. The surfaces of the core strips 32 that face each other in the direction of lamination are glued together, improving rigidity of the core segments 31, and further effectively suppressing vibration and noise.

Figure 17:
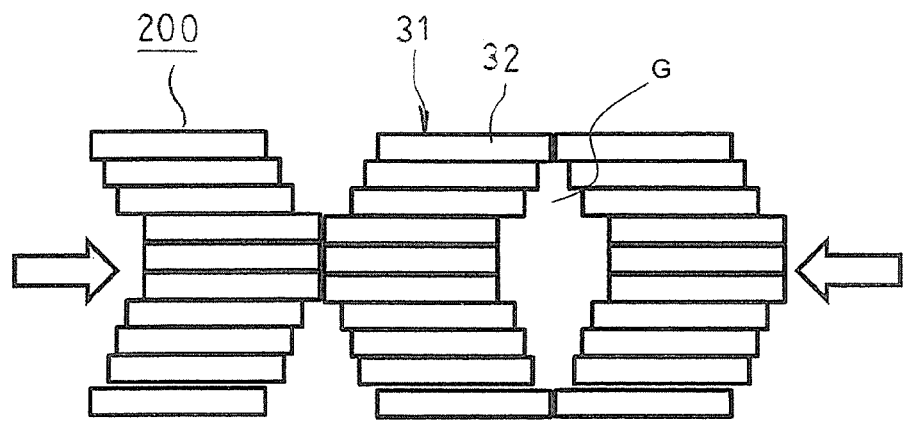
FIG. 17 is a schematic diagram that explains a problem that arises in an inner core if rigidity is high in laminated cores in the rotary electric machine according to Embodiment 1 of the present invention.

Now, the armature core 11 is produced by mounting the inner core 30, which is configured by arranging laminated cores 200 into an annular shape such that the circumferential side surfaces of the core back portions 31a are butted against each other, inside the outer core 29 by press-fitting, shrink-fitting, etc. Here, if alignment of the core strips 32 in the direction of lamination is poor during production of the core segments 31, side surfaces in the circumferential direction of the core back portions 31a become irregular. If the inner core 30 is produced by arranging the laminated cores 200 that are produced in this manner into an annular shape, then gaps G arise at the butted portions on the circumferential side surfaces of the core back portions 31a, as shown in FIG. 17.

Figure 18:
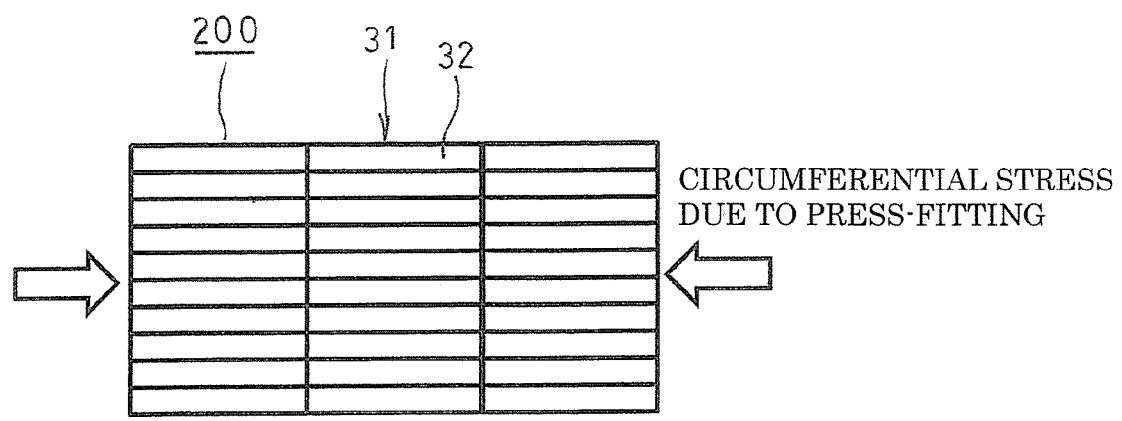
FIG. 18 is a schematic diagram that shows an inner core if rigidity is low in laminated cores in the rotary electric machine according to Embodiment 1 of the present invention.

If the rigidity of the laminated cores 200 is high, the gaps G in question remain even if the inner core 30 is mounted into the outer core 29. On the other hand, if the rigidity of the laminated cores 200 is reduced, then circumferential stresses are generated by mounting the inner core 30 into the outer core 29. The core strips 32 are displaced circumferentially by these stresses, arranging the core strips 32 neatly in columns in the direction of lamination. As shown in FIG. 18, the circumferential side surfaces of the core back portions 31a thereby contact each other reliably, eliminating the gaps G. Thus, magnetic resistance at the butted portions in question is reduced, enabling increases in output to be achieved. In addition, because the circumferential side surfaces of the core back portions 31a contact each other reliably, circumferential stresses that are generated by mounting the inner core 30 into the outer core 29 act uniformly on the surface of the circumferential side surfaces of the core back portions 31a. The stresses that act on the inner core 30 of the armature core 11 are thereby reduced, enabling hysteresis loss to be reduced, and enabling increases in efficiency to be achieved. Stresses that act on the adhesive 17 can also be reduced by reducing the rigidity of the core segments 31, enabling cracking of the adhesive 17 to be prevented. A configuration of this kind is effective when it is desirable to achieve increases in output and increases in efficiency in the rotary electric machine.

By adjusting the viscosity of the adhesive 17 in this manner, desired properties can be obtained.

Figure 19:
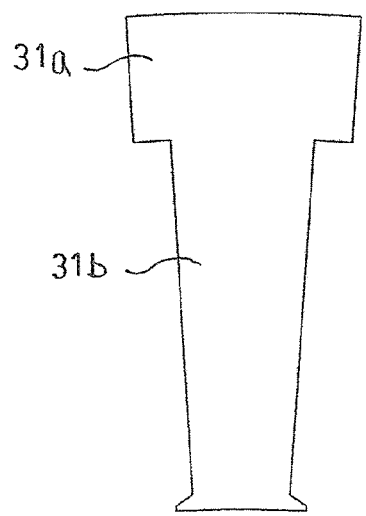
FIG. 19 is an end elevation that shows a core segment before affixing electrically insulating members when viewed from outside in a direction of lamination.
Figure 20:
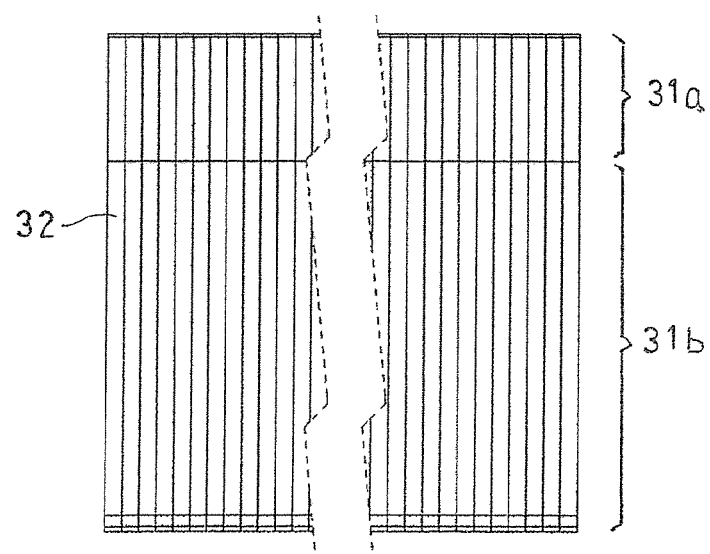
FIG. 20 is a side elevation that shows a core segment before affixing electrically insulating members.
Figure 21:
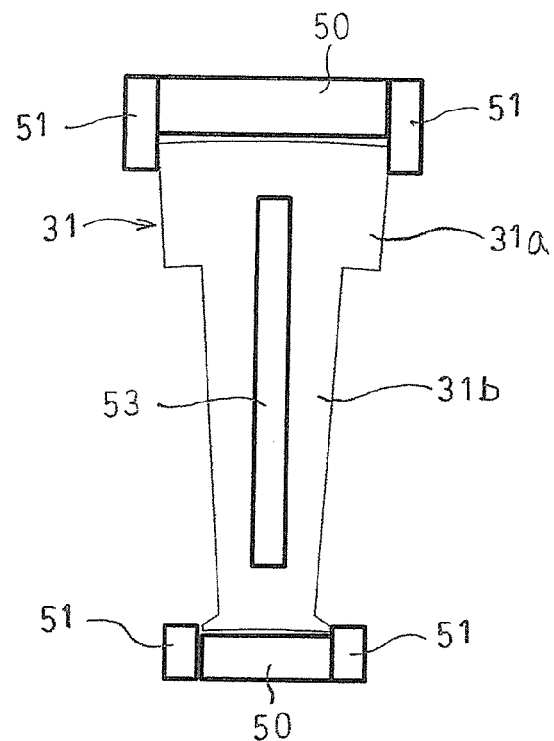
FIG. 21 is an end elevation that shows the core segment before affixing electrically insulating members in a state that is restricted by movement restricting members.
Figure 22:
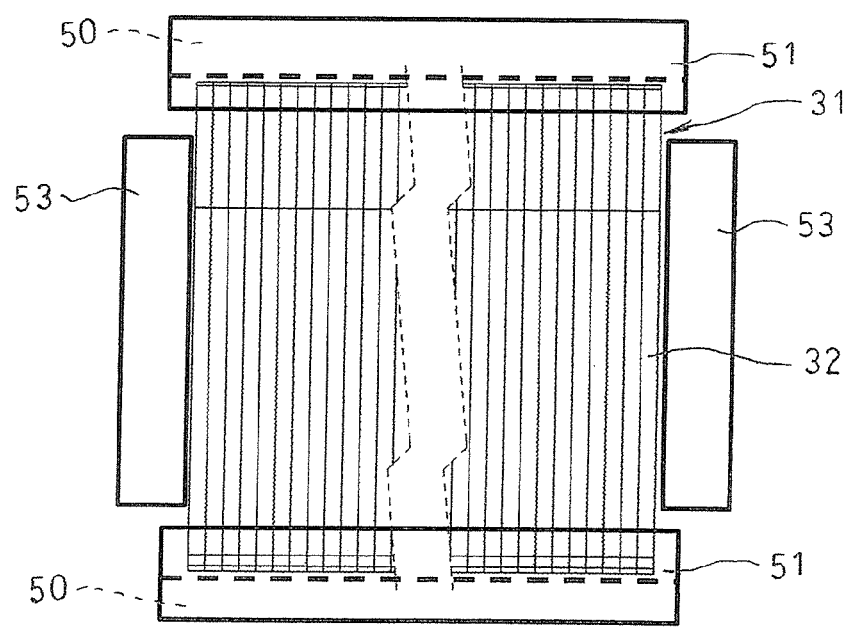
FIG. 22 is a side elevation that shows the core segment before affixing electrically insulating members in the state that is restricted by the movement restricting members.
Figure 23:
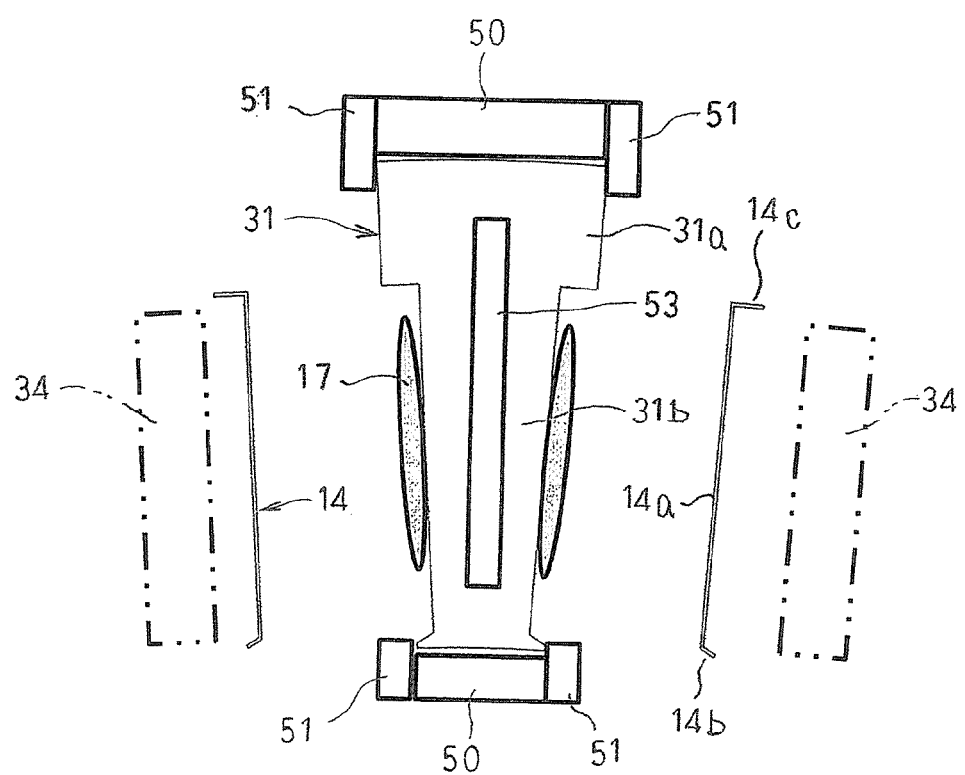
FIG. 23 is an end elevation that explains a step of applying an adhesive to the core segment.
Figure 24:
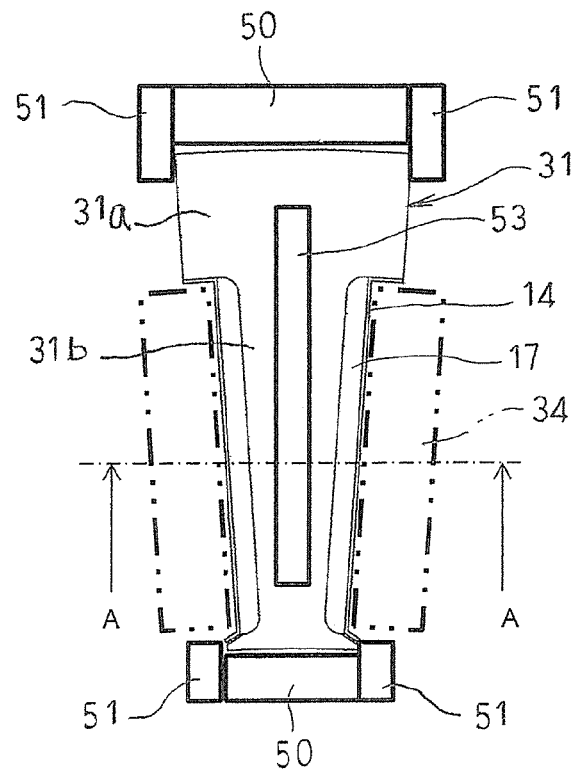
FIG. 24 is an end elevation that explains a step of mounting electrically insulating members to the core segment.
Figure 25:
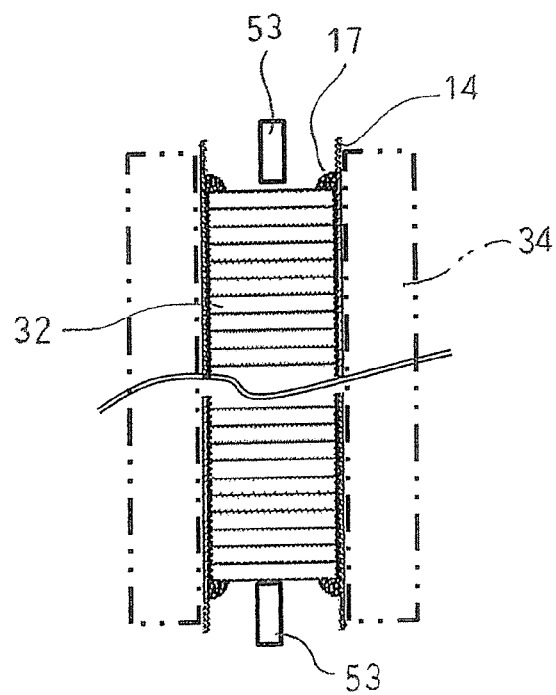
FIG. 25 is a cross section that is taken along A-A in FIG. 24 so as to be viewed in the direction of the arrows.

A manufacturing method and a manufacturing apparatus for the laminated cores 200 will be explained using FIGS. 19 through 28. FIG. 19 is an end elevation that shows a core segment before affixing electrically insulating members when viewed from outside in a direction of lamination, FIG. 20 is a side elevation that shows a core segment before affixing electrically insulating members, FIG. 21 is an end elevation that shows the core segment before affixing electrically insulating members in a state that is restricted by movement restricting members, FIG. 22 is a side elevation that shows the core segment before affixing electrically insulating members in the state that is restricted by the movement restricting members, FIG. 23 is an end elevation that explains a step of applying an adhesive to the core segment, FIG. 24 is an end elevation that explains a step of mounting electrically insulating members to the core segment, FIG. 25 is a cross section that is taken along A-A in FIG. 24 so as to be viewed in the direction of the arrows, FIG. 26 is a schematic diagram that shows a manufacturing apparatus for the laminated core viewed from a punching direction, FIG. 27 is a schematic diagram that shows the manufacturing apparatus for the laminated core viewed from a direction that is perpendicular to the punching direction, and FIG. 28 is a flow diagram that explains a laminated core manufacturing method.

Figure 26:
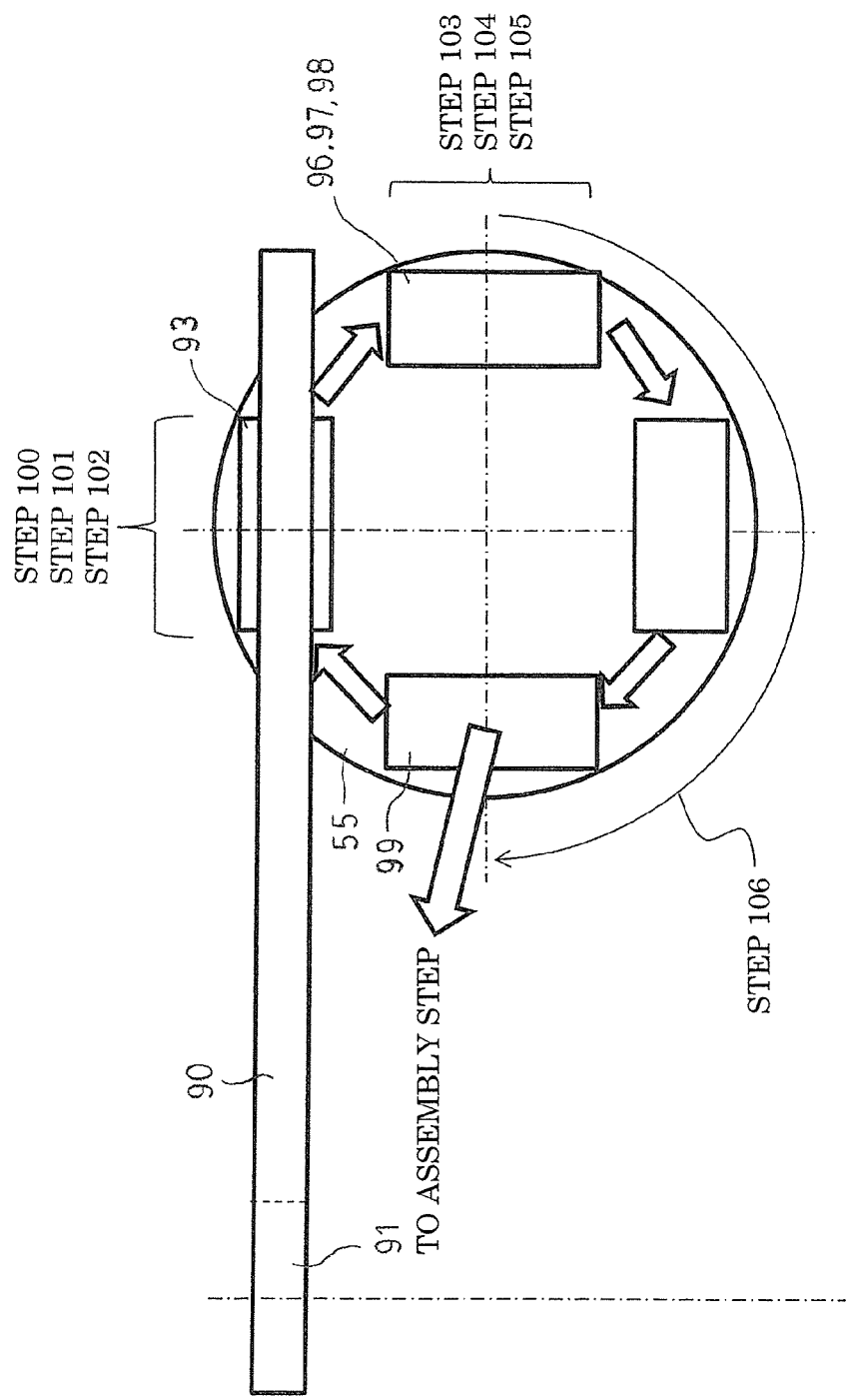
FIG. 26 is a schematic diagram that shows a manufacturing apparatus for the laminated core viewed from a punching direction.
Figure 27:
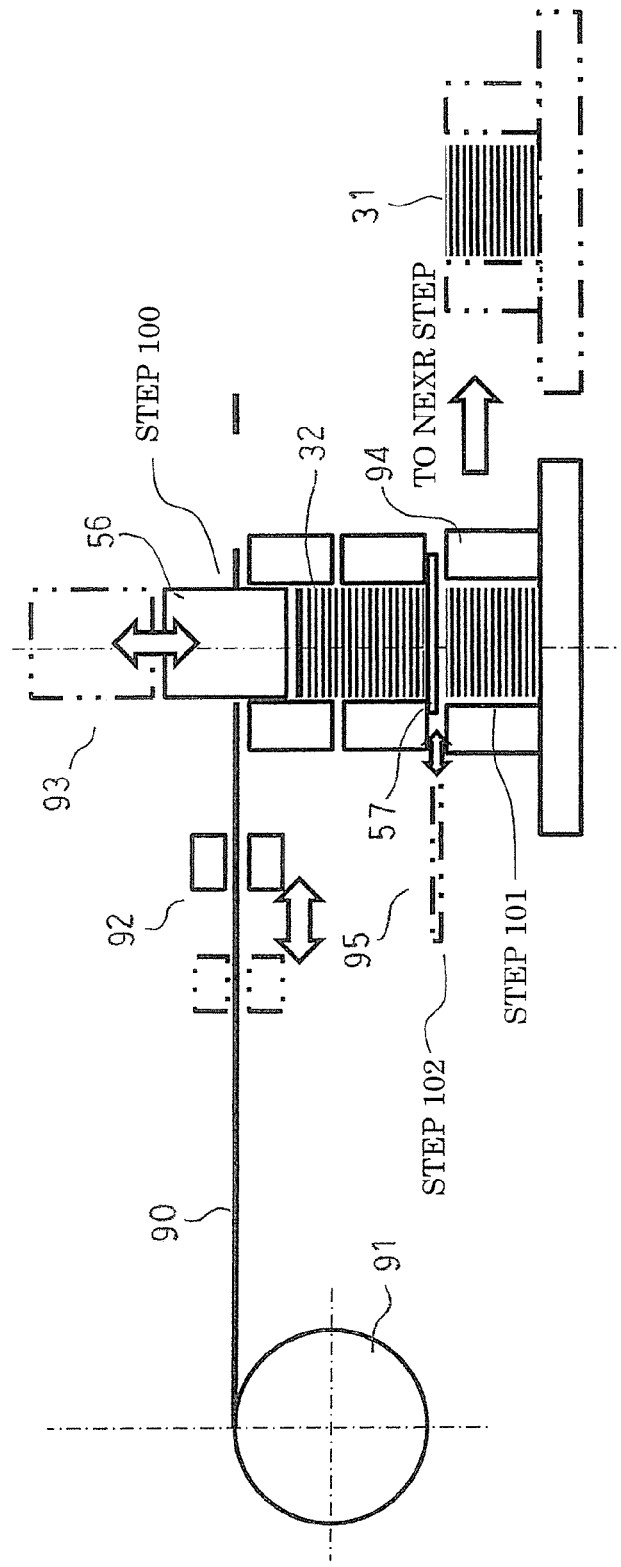
FIG. 27 is a schematic diagram that shows the manufacturing apparatus for the laminated core viewed from a direction that is perpendicular to the punching direction.
Figure 28:
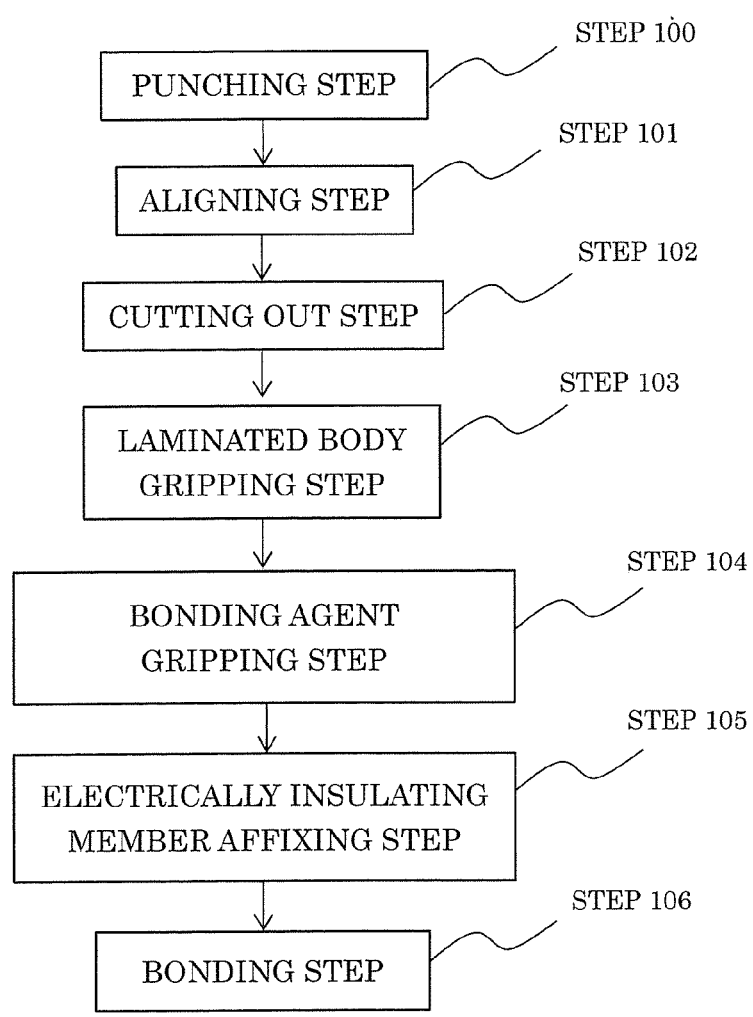
FIG. 28 is a flow diagram that explains a laminated core manufacturing method.

As shown in FIGS. 26 and 27, the manufacturing apparatus has: a material supplying portion 91 that supplies a hoop material 90 of electromagnetic steel sheet; a material feeding portion 92 that feeds the hoop material 90 at a set pitch; a punching portion 93 that punches the core strips 32 out of the hoop material 90; an aligning portion 94 that aligns the punched core strips 32; a cutting out portion 95 that cuts out the core segment 31, which is a laminated body of a set number of aligned core strips 32; a gripping portion 96 that grips the cut-out core segment 31; an adhesive applying portion 97 that applies the adhesive 17 to the core segment 31; a pressing portion 98 that presses the electrically insulating members 14 onto the tooth portion 31b of the core segment 31; and an index table 55 that conveys the laminated core 200 to the next step, etc.

Here, the gripping portion 96 restricts movement in the radial direction, the circumferential direction, and the axial direction of the core strips 32 that constitute the core segments 31. Specifically, the gripping portion 96 is constituted by: radial restricting members 50, circumferential restricting members 51, and axial restricting members 53 that are shown in FIG. 21. Moreover, the radial restricting members 50, the circumferential restricting members 51, and the axial restricting members 53 have separate constructions, but may be constituted by integrated members provided that their respective functions are achieved.

The adhesive applying portion 97 is constituted by an adhesive dispenser 59, for example. The pressing portion 98 includes pressing members 34 that are shown in FIG. 23.

First, the hoop material 90 that is supplied from the material supplying portion 91 is fed to the punching portion 93 at a set pitch by the material feeding portion 92. At the punching portion 93, the T-shaped core strips 32 are punched out of the hoop material 90 by the punching member 56 (Step 100: punching step). The punched core strips 32 are pushed out downward in a laminated state, and are inserted into the aligning portion 94, which is disposed below the punching portion 93. The core strips 32 are laminated in an aligned state by being inserted into the aligning portion 94 (Step 101: aligning step). When the set number of core strips 32 is inserted into the aligning portion 94, a cutting out member 57 of the cutting out portion 95 is inserted above the aligning portion 94, stopping insertion of the core strips 32 into the aligning portion 94 (Step 102: cutting out step). Then the index table 55 rotates, and the core segment 31, which includes a set number of laminated core strips 32, is conveyed to the next step.

In the core segment 31, the core strips 32 are laminated so as to be stacked neatly, as shown in FIGS. 19 and 20. Then the radial restricting members 50 are pressed against an outer circumferential surface of the core back portion 31a and an inner circumferential surface of the tooth portion 31b of the core segment 31 from two radial sides. The circumferential restricting members 51 are pressed against radially outer end portions of two circumferential side surfaces of the core back portion 31a and radially inner end portions of two circumferential side surfaces of the tooth portion 31b of the core segment 31 from two circumferential sides. In addition, the axial restricting members 53 are pressed against two axial end surfaces of the core segment 31 from two axial sides. In this manner, as shown in FIGS. 21 and 22, the core segment 31 is gripped by the radial restricting members 50, the circumferential restricting members 51, and the axial restricting members 53 such that movement is restricted in the radial direction, the circumferential direction, and the axial direction (Step 103: laminated body gripping step).

Next, the adhesive 17 is applied to the two circumferential side surfaces of the tooth portion 31b of the core segment 31, as shown in FIG. 23 (Step 104: the bonding agent mounting step). Next, as shown in FIG. 23, the electrically insulating members 14 are disposed so as to face each other on two side surfaces of the tooth portion 31b of the core segment 31 to which the adhesive 17 has been applied, and are pressed against the two side surfaces of the tooth portion 31b by the pressing members 34 (Step 105: electrically insulating member affixing step). As shown in FIGS. 24 and 25, the adhesive 17 is thereby pushed and spread by the pushing pressure from the pressing members 34, and fills between the side surfaces of the tooth portion 31b of the core segment 31 and the electrically insulating members 14.

Next, the index table 55 rotates, and the core segment 31, which is in a state in which the electrically insulating members 14 have been pressed by the pressing members 34, is conveyed to the next step. Here, if the adhesive 17 is a two-liquid curing adhesive or an anaerobic adhesive, then the core segment 31 is conveyed to an extracting portion 99 for an assembly process. The adhesive 17 is cured during this conveying step, bonding the core segment 31 and the electrically insulating members 14 together (Step 106: bonding step), to produce a laminated core 200. If the adhesive 17 is a thermosetting adhesive, a heating bath is installed between the pressing portion 98 and the extracting portion 99, and the core segment 31 is conveyed to the heating bath by the index table 55, curing the adhesive 17 and bonding the core segment 31 and the electrically insulating members 14 together (Step 106: bonding step), to produce a laminated core 200. In this manner, the laminated core 200 in which the electrically insulating members 14 have been mounted to the core segment 31 by means of the adhesive 17 is conveyed from the extracting portion 99 to the assembly process.

Moreover, in Embodiment 1, a case in which the angle of rotation of the index table 55 is 90 degrees has been explained, but the angle of rotation of the index table 55 is not limited to 90 degrees. Furthermore, the conveying means for the core segments 31 is not limited to the index table 55.

Figure 29:
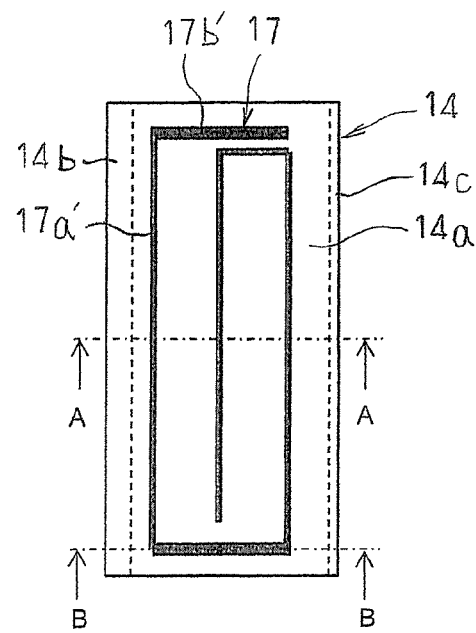
FIG. 29 is a plan that shows a state in which the adhesive is applied to the electrically insulating members.

Application patterns when the adhesive 17 is applied to the electrically insulating members 14 will now be explained. FIG. 29 is a plan that shows a state in which the adhesive is applied to the electrically insulating members, FIG. 30 is a cross section that is taken along A-A in FIG. 29 so as to be viewed in the direction of the arrows, and FIG. 31 is a cross section that is taken along B-B in FIG. 29 so as to be viewed in the direction of the arrows.

Figure 30:
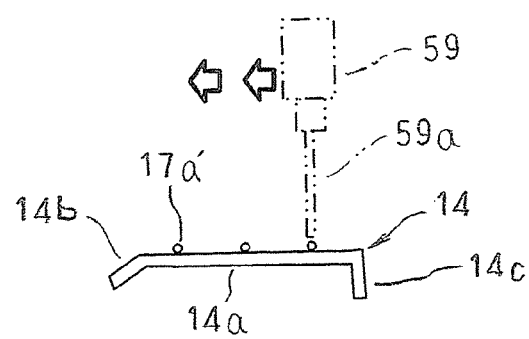
FIG. 30 is a cross section that is taken along A-A in FIG. 29 so as to be viewed in the direction of the arrows.
Figure 31:
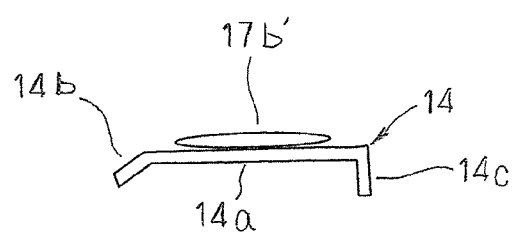
FIG. 31 is a cross section that is taken along B-B in FIG. 29 so as to be viewed in the direction of the arrows.

As shown in FIG. 30, the adhesive 17 is applied from a nozzle 59a of an adhesive dispenser 59 to portions of the electrically insulating members 14 that correspond to side surfaces of the tooth portion 31b of the core segment 31. Here, application patterns 17a' and 17b' of the adhesive 17 in FIGS. 29 through 30 are for forming the adhesive base portion 17a and the hook portions 17b, respectively. The adhesive 17 is applied to regions of the electrically insulating members 14 that face two axial edge portions of the side surfaces of the tooth portion 31b of the core segment 31 in the application patterns 17b', and is applied to other regions of the electrically insulating members 14 in the application patterns 17a'. Thickness is thin and width is narrow in the application patterns 17a'. On the other hand, thickness is thick and width is wide in the application patterns 17b'.

The quantity applied per unit area in the regions of the electrically insulating members 14 that face the two axial edge portions of the side surfaces of the tooth portion 31b of the core segment 31 is thereby greater than the quantity applied per unit area in the other regions of the electrically insulating members 14. Because the adhesive 17 thereby protrudes at the two circumferential edge portions on the two axial end surfaces of the tooth portion 31b of the core segment 31 and is cured, the hook portions 17b are reliably formed. Because the layers of adhesive 17 between the side surfaces of the tooth portion 31b of the core segment 31 and the electrically insulating members 14 is thinner, material saving of the adhesive 17 can be achieved. In addition, by making the layers of adhesive 17 thinner, adhesive strength can be increased compared to when the layers of adhesive 17 are thick.

Moreover, the adhesive 17 may be applied to the electrically insulating members 14 uniformly, but from such considerations it is desirable to make the quantity applied per unit area in the regions of the electrically insulating members 14 that face the two axial edge portions of the side surfaces of the tooth portion 31b of the core segment 31 greater than the quantity applied per unit area of the other regions of the electrically insulating members 14.

Here, to facilitate explanation, a case in which the adhesive 17 is applied to the electrically insulating members 14 has been explained, but similar or identical application patterns can be adopted even if the adhesive 17 is applied to the side surfaces of the tooth portion 31b of the core segment 31.

An adhesive in sheet form may be affixed instead of applying adhesive in liquid form. If the adhesive in sheet form is used, then irregularities in the quantity applied due to changes in viscosity and intake of air into the adhesive can be suppressed compared to when adhesive in liquid form is used. Thus, because the supply of adhesive can be minimized if the adhesive in sheet form is used, the amount of adhesive used can be effectively reduced.

In Embodiment 1, electrically insulating members 14 and a core segment 31 are joined together by applying an adhesive 17 that functions as a bonding agent to side surfaces of a tooth portion 31b of the core segment 31, or applying the adhesive 17 to surfaces of the electrically insulating members 14 that face the tooth portion 31b, or applying the adhesive 17 to both surfaces, i.e., the side surfaces of the tooth portion 31b and the surfaces of the electrically insulating members 14, and curing the adhesive 17 in a state in which the electrically insulating members 14 are pressed onto the tooth portion 31b from circumferentially outside by pressing members 34, to manufacture a laminated core 200. The effects of adopting this manufacturing method will now be explained.

First, in a manufacturing method in which adhesive 17 is applied between all of the stacked core strips 32, glued positions are proportionate to the number of laminated core strips 32, that is to say, there are several hundred positions, but in the present manufacturing method, there are two glued positions, i.e., between the two side surfaces of the tooth portion 31b of the core segment 31 and the electrically insulating members 14, enabling productivity to be improved.

In the present manufacturing method, because application of the adhesive 17 is in a single bonding agent mounting step, productivity is improved.

Figure 32:
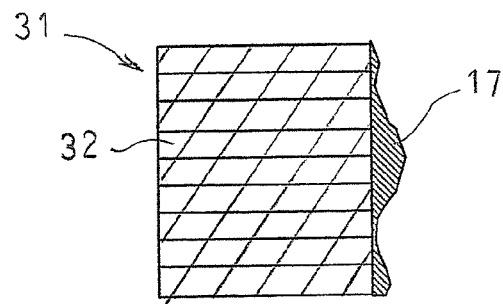
FIG. 32 is a partial cross section that shows a state in which adhesive has been applied to a side surface of a tooth portion non-uniformly.

When the adhesive 17 was simply applied to the side surfaces of the tooth portion 31b of the core segment 31, it was difficult to suppress irregularities in the film thickness of the adhesive 17, as shown in FIG. 32. Because of that, one problem has been that the layer of adhesive 17 breaks at thin portions. If the quantity of adhesive 17 applied is increased, space for mounting the coils inside the slots is reduced due to the increase in film thickness. Thus, the cross-sectional area of the coils must be reduced, increasing copper loss, and making the efficiency of the rotary electric machine poor.

In the present manufacturing method, because the electrically insulating members 14 are pressed onto the tooth portion 31b, the film thickness of the applied adhesive 17 is made uniform, suppressing irregularities in adhesive strength. Thus, according to the present manufacturing method, management costs for ensuring required adhesive strength can be reduced.

In the present manufacturing method, because pressure is applied to the adhesive 17 by means of the electrically insulating members 14, the adhesive 17 does not adhere to the pressing members 34, improving maintainability. Thus, according to the present manufacturing method, processing that increases die release characteristics of the pressing members 34 is no longer required, improving productivity.

In the present manufacturing method, because the inner core 30 is produced so as to have an annular shape by butting together the side surfaces of the core back portions 31a of the core segments 31, it is desirable not to let the adhesive 17 adhere to the side surfaces of the core back portions 31a of the core segments 31 that are placed in contact with each other.

In a manufacturing method in which adhesive 17 is applied between all of the stacked core strips 32, it has been necessary to lower the viscosity of the adhesive 17 in order for the adhesive 17 to be impregnated between the core strips 32. Thus, it was difficult to selectively dispose portions where the adhesive 17 is not applied. The adhesive 17 easily adhered to the two circumferential side surfaces of the core back portions 31a of the core segments 31.

In the present manufacturing method, because it is not necessary to impregnate the adhesive 17 between the stacked core strips 32, constraints on the viscosity of the adhesive 17 are eliminated, enabling the viscosity of the adhesive 17 to be increased. In the present manufacturing method, the adhesive 17 is applied only to the side surfaces of the tooth portion 31b of the core segment 31. In the present manufacturing method, adhesion of the adhesive 17 onto the two circumferential side surfaces of the core back portion 31a of the core segment 31 can thereby easily be stopped. Thus, in the present manufacturing method, because the adhesive 17 does not adhere to the side surfaces of the core back portion 31a of the core segment 31, assembly precision of the inner core 30 is increased.

In this manufacturing method, because the punching step and the bonding agent mounting step are separate steps, the adhesive can be prevented from adhering to the die in the punching step, effectively improving maintainability. In the present manufacturing method, construction of the die can also be simplified compared to manufacturing methods in which an adhesive is applied inside the die, enabling manufacturing costs to be reduced.

In the laminated core 200 according to Embodiment 1, the electrically insulating members 14 are fixed to the two circumferential side surfaces of the tooth portion 31b of the core segment 31 by the adhesive 17, and core strips 32 that are laminated axially are fixed by the adhesive 17 so as to be integrated. The effects of adopting this core construction will now be explained.

Unlike when core strips 32 that are laminated axially are fixed by crimping or welding, because the core strips 32 of the laminated core 200 do not short-circuit electrically with each other, the efficiency of the rotary electric machine can be improved. In addition, because the laminated core 200 has no crimped or welded fixed portions where residual stresses may be present, hysteresis loss is reduced, enabling the efficiency of the rotary electric machine to be improved.

Because the inner core 30 is divided into a plurality of the laminated cores 200, affixing of the electrically insulating members 14 is facilitated compared to when the inner core 30 is configured using a single integrated body, enabling productivity to be improved.

Because it is not necessary to fill the adhesive 17 between all of the core strips 32, and the glued positions are reduced, the laminated core 200 is less likely to be affected by irregularities in adhesive strength, improving quality, and also reducing management costs. In addition, since the bonding area can be reduced together with reductions in the glued positions, material saving can be achieved. Since the laminated core strips 32 are fixed to each other not only by the adhesive 17 but also by the electrically insulating members 14, strength of the laminated core 200 is increased.

As shown in FIG. 15, the electrically insulating members 14 are configured into a U shape that is constituted by: a rectangular base portion 14a that faces a side surface of the tooth portion 31b; and folded portions 14b and 14c that are formed by folding two side portions in a width direction of the base portion 14a in identical directions. The rigidity of the laminated core 200 in the direction of a bending moment that is shown in FIG. 14 is improved thereby, enabling the rigidity of the laminated core 200 to be improved.

Here, the folded portions 14b and 14c and the laminated core strips 32 may also be fixed by the adhesive 17. Because the folded portions 14b and 14c are thereby integrated with the laminated core strips 32, in addition to the base portion 14a, the rigidity of the laminated core 200 can effectively be further improved.

Figure 33:
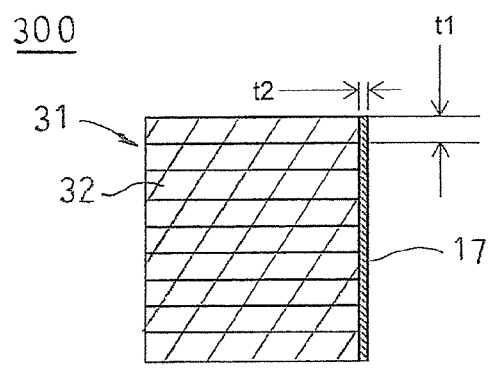
FIG. 33 is a partial cross section that shows a comparative laminated core in which adhesive has been applied to a side surface of a tooth portion at a uniform film thickness.
Figure 34:
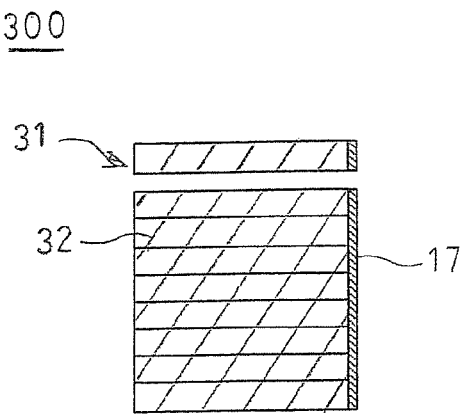
FIG. 34 is a partial cross section that shows a failure mode at an end portion in the direction of lamination of the comparative laminated core in which adhesive has been applied to a side surface of a tooth portion at a uniform film thickness.
Figure 36:
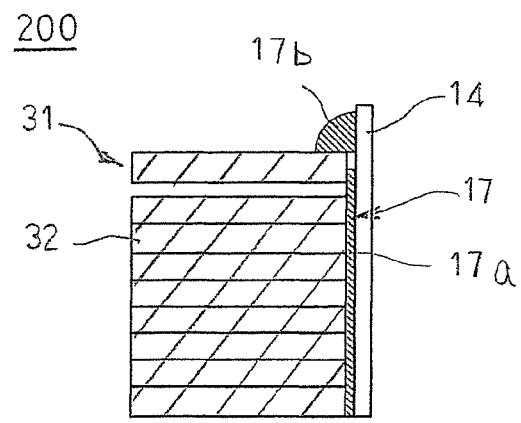
FIG. 36 is a partial cross section that shows a first failure mode at an end portion in the direction of lamination of the laminated core according to Embodiment 1 of the present invention.
Figure 37:
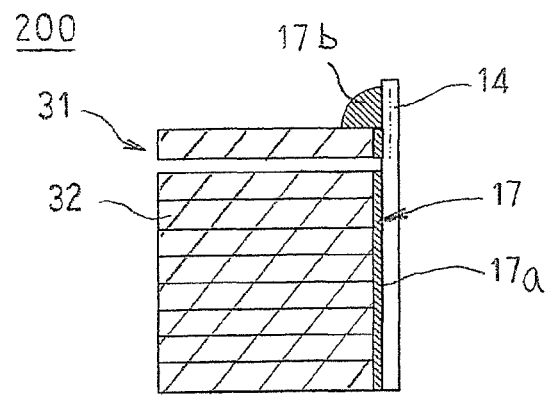
FIG. 37 is a partial cross section that shows a second failure mode at an end portion in the direction of lamination of the laminated core according to Embodiment 1 of the present invention.
Figure 38:
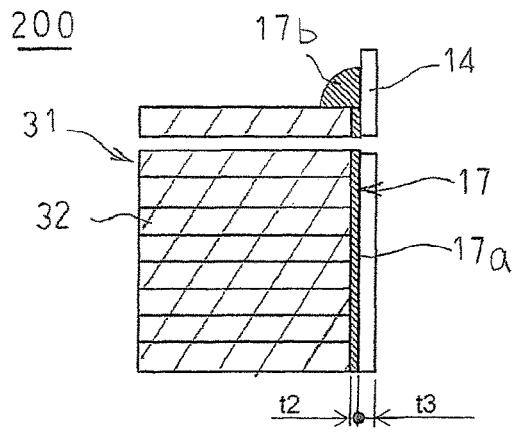
FIG. 38 is a partial cross section that shows a third failure mode at an end portion in the direction of lamination of the laminated core according to Embodiment 1 of the present invention.

Next, strength-improving effects due to this core construction will be explained using failure modes in an end portion in the direction of lamination of the laminated core 200. FIG. 33 is a partial cross section that shows a comparative laminated core in which adhesive has been applied to a side surface of a tooth portion at a uniform film thickness, FIG. 34 is a partial cross section that shows a failure mode at an end portion in the direction of lamination of the comparative laminated core in which adhesive has been applied to a side surface of a tooth portion at a uniform film thickness, FIG. 35 is a partial cross section that shows a laminated core according to Embodiment 1 of the present invention, FIG. 36 is a partial cross section that shows a first failure mode at an end portion in the direction of lamination of the laminated core according to Embodiment 1 of the present invention, FIG. 37 is a partial cross section that shows a second failure mode at an end portion in the direction of lamination of the laminated core according to Embodiment 1 of the present invention, and FIG. 38 is a partial cross section that shows a third failure mode at an end portion in the direction of lamination of the laminated core according to Embodiment 1 of the present invention.

Generally, core strips 32 that have a sheet thickness in the order of 0.1 mm to 0.5 mm are most often used in core segments 31. It is known that if the film thickness of the adhesive 17 is greater than 0.1 mm, on the other hand, materials yield deteriorates, and defects such as voids are also more likely to arise inside the adhesive 17, reducing adhesive strength.

In a comparative laminated core 300, as shown in FIG. 33, film thickness of an applied adhesive 17 is made uniform on side surfaces of a tooth portion. In this comparative laminated core 300, when a force arises in the direction of lamination of core strips 32, if the end portion of the adhesive 17 in the direction of lamination breaks in the direction of lamination, the laminated core 300 will separate in the direction of lamination, as shown in FIG. 34.

Figure 35:
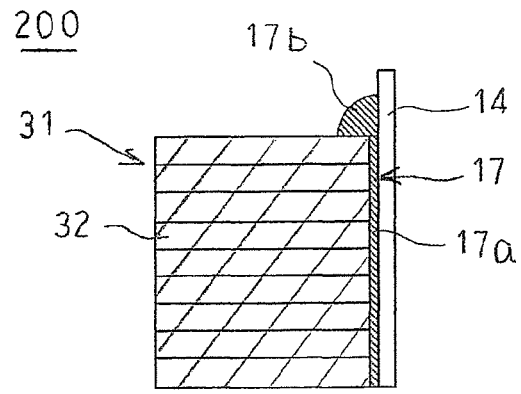
FIG. 35 is a partial cross section that shows a laminated core according to Embodiment 1 of the present invention.

In the present laminated core 200, as shown in FIG. 35, the electrically insulating members 14 are fixed to the side surfaces of the tooth portion 31b of the core segment 31 by the adhesive 17, and hook portions 17b protrude onto the end surfaces of the tooth portion 31b.

Thus, in a first failure mode, as shown in FIG. 36, a portion of the adhesive 17 that is fixed adhesively to the core strips 32 that are positioned on the end portion in the direction of lamination breaks, an interface between the core strips 32 that are positioned on the end portion in the direction of lamination and the adhesive 17 fails due to shearing, and an interface between a hook portion 17b of the adhesive 17 and an electrically insulating member 14 fails due to shearing. In this first failure mode, the laminated core 200 is separated in the direction of lamination. In other words, unless three conditions of this kind coincide, separation of the laminated core 200 in the direction of lamination is stopped.

In a second failure mode, as shown in FIG. 37, the adhesive 17 breaks between two core strips 32 that are positioned on the end portion in the direction of lamination, and an interface between the adhesive 17 and an electrically insulating member 14 fails due to shearing in an entire region near the end portion in the direction of lamination from the position at which the adhesive 17 has broken. In this second failure mode, the laminated core 200 is separated in the direction of lamination. In other words, unless two conditions of this kind coincide, separation of the laminated core 200 in the direction of lamination is stopped.

In this manner, according to the present core construction, the strength of the laminated core 200 can be increased significantly compared to the comparative laminated core 300. Thus, it is desirable to make the thickness t2 of the adhesive 17 thinner than the thickness t1 of the core strips 32. By making the thickness t2 of the adhesive 17 thinner, material saving can be achieved.

In a third failure mode, as shown in FIG. 38, the adhesive 17 fails due to shearing between two core strips 32 that are positioned on the end portion in the direction of lamination, and an electrically insulating member 14 fails due to shearing at the position at which the failure of the adhesive 17 due to shearing occurs. In this third failure mode, the laminated core 200 is separated in the direction of lamination. Thus, it is desirable to increase the shearing strength of the electrically insulating members 14 by making a thickness t3 of the electrically insulating members 14 thicker than the thickness t2 of the adhesive 17. The failure mode thereby becomes the first failure mode or the second failure mode, increasing the strength of the laminated core 200.

Figure 39:
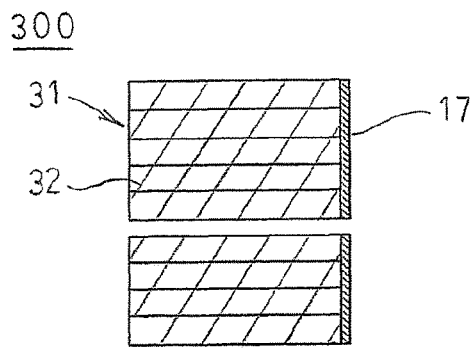
FIG. 39 is a partial cross section that shows a failure mode at a central portion in the direction of lamination of a comparative laminated core in which adhesive has been applied to a side surface of a tooth portion at a uniform film thickness.

Next, strength-improving effects due to this core construction will be explained using failure modes in a central portion in the direction of lamination of the laminated core 200. FIG. 39 is a partial cross section that shows a failure mode at a central portion in the direction of lamination of the comparative laminated core in which adhesive has been applied to a side surface of a tooth portion at a uniform film thickness, FIG. 40 is a partial cross section that shows a fourth failure mode at a central portion in the direction of lamination of the laminated core according to Embodiment 1 of the present invention, and FIG. 41 is a partial cross section that shows a fifth failure mode at a central portion in the direction of lamination of the laminated core according to Embodiment 1 of the present invention.

In the comparative laminated core 300, if the central portion of the adhesive 17 in the direction of lamination breaks in the direction of lamination, the laminated core 300 will separate in the direction of lamination, as shown in FIG. 39. Thus, in the comparative laminated core 300, the strength is similar or identical whether the adhesive 17 breaks at an end portion in the direction of lamination, or whether the adhesive 17 breaks at a central portion in the direction of lamination.

Figure 40:
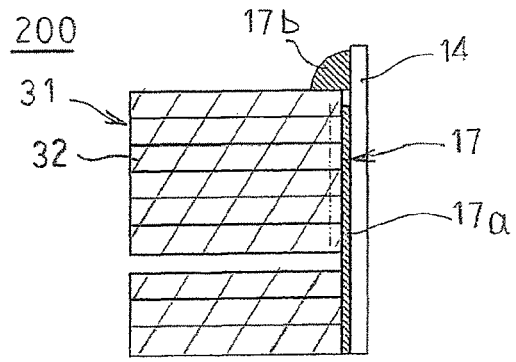
FIG. 40 is a partial cross section that shows a fourth failure mode at a central portion in the direction of lamination of the laminated core according to Embodiment 1 of the present invention.

In the present core construction, in a fourth failure mode, as shown in FIG. 40, the adhesive 17 breaks near the end portion in the direction of lamination, and an interface between the adhesive 17 and core strips 32 fails due to shearing in an entire region near a central portion in the direction of lamination from the position at which the adhesive 17 has broken. In this fourth failure mode, the laminated core 200 is separated in the direction of lamination. In other words, unless three conditions of this kind coincide, separation of the laminated core 200 in the direction of lamination is stopped.

Figure 41:
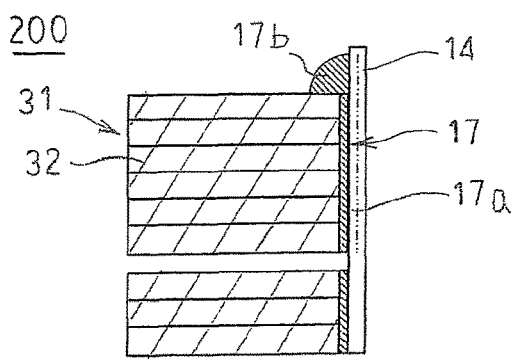
FIG. 41 is a partial cross section that shows a fifth failure mode at a central portion in the direction of lamination of the laminated core according to Embodiment 1 of the present invention.

In a fifth failure mode, as shown in FIG. 41, the adhesive 17 breaks at a central portion in the direction of lamination, and an interface between the adhesive 17 and an electrically insulating member 14 fails due to shearing in an entire region near the end portion in the direction of lamination from the position at which the adhesive 17 has broken. In this fifth failure mode, the laminated core 200 is separated in the direction of lamination. In other words, unless two conditions of this kind coincide, separation of the laminated core 200 in the direction of lamination is stopped.

In this manner, according to the present construction, the strength of the laminated core 200 can be increased significantly compared to the comparative laminated core 300.

Figure 42:
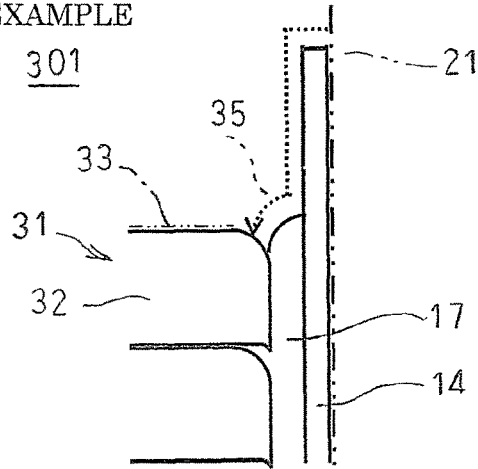
FIG. 42 is a partial cross section that explains an electrical discharge pathway in a comparative laminated core on which a hook portion is not formed.

Next, the effects of having the hook portions 17b of the adhesive 17 will be explained. FIG. 42 is a partial cross section that explains an electrical discharge pathway in a comparative laminated core on which a hook portion is not formed, and FIGS. 43 and 44 are each partial cross sections that explain an electrical discharge pathway in a laminated core on which a hook portion is formed.

Because the hook portions 17b are formed so as to protrude onto two circumferential edge portions on the end surfaces of the core segment 31 in the direction of lamination, as shown in FIG. 15, the core segment 31 is clamped and held by the hook portions 17b from two sides in the direction of lamination. Thus, even if peeling were hypothetically to arise at an interface between the adhesive 17 and the side surfaces of the tooth portion 31b of the core segment 31, because the core strips 32 that constitute the core segment 31 are prevented from dislodging, the laminated core 200 is prevented from falling apart.

Damage may arise in insulating coatings 33 that are coated onto the surfaces of the core strips 32 in a vicinity of rounding that occurs due to punching. In a comparative laminated core 301 on which hook portions 17b are not formed, as shown in FIG. 42, pinholes or scratches that have been formed in the damaged portion of the insulating coatings 33 in the vicinity of the rounding of the core strips 32 are exposed. Thus, the electrical discharge pathways 35 between the coils 21 and the core segment 31 that are formed by means of the pinholes or scratches in question are shorter, and there is a possibility that surface creepage discharge may arise and damage the laminated core 301.

Figure 43:
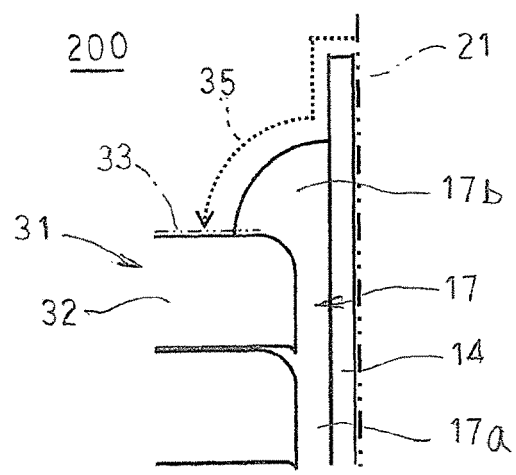
FIG. 43 is a partial cross section that explains an electrical discharge pathway in a laminated core on which a hook portion is formed.
Figure 44:
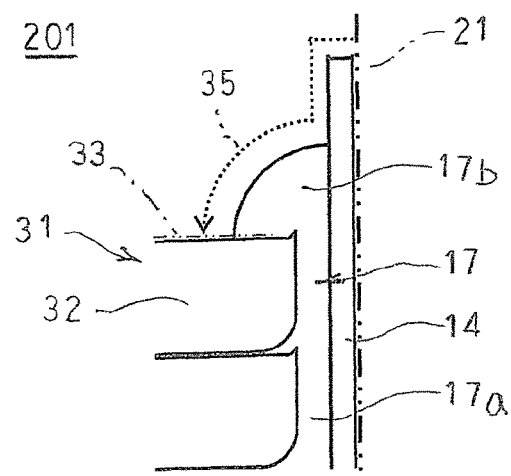
FIG. 44 is a partial cross section that explains an electrical discharge pathway in a laminated core on which a hook portion is formed.

In the laminated core 200, as shown in FIG. 43, the hook portions 17b cover the damaged portions in the vicinity of the rounding of the insulating coating 33 that arises due to punching. Thus, even if pinholes or scratches were hypothetically formed in the region of the insulating coating 33 that is coated onto the core strips 32 that is not covered by the hook portions 17b, electrical discharge pathways 35 between the coils 21 and the core segment 31 that are formed by means of the pinholes or scratches in question would be longer. The occurrence of surface creepage discharge is thereby suppressed, enabling insulation to be improved.

In a laminated core 201, as shown in FIG. 44, the hook portions 17b cover the damaged portions in the vicinity of burring of the insulating coating 33 that arises due to punching. Thus, even if pinholes or scratches were hypothetically formed in the region of the insulating coating 33 that is coated onto the core strips 32 that is not covered by the hook portions 17b, electrical discharge pathways 35 between the coils 21 and the core segment 31 that are formed by means of the pinholes or scratches in question would be longer. The occurrence of surface creepage discharge is thereby suppressed, enabling insulation to be improved.

Embodiment 2

Figure 45:
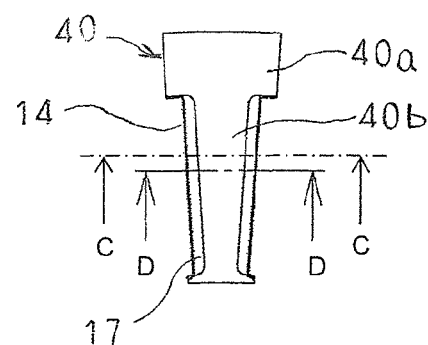
FIG. 45 is an end elevation that shows a laminated core according to Embodiment 2 of the present invention.
Figure 46:
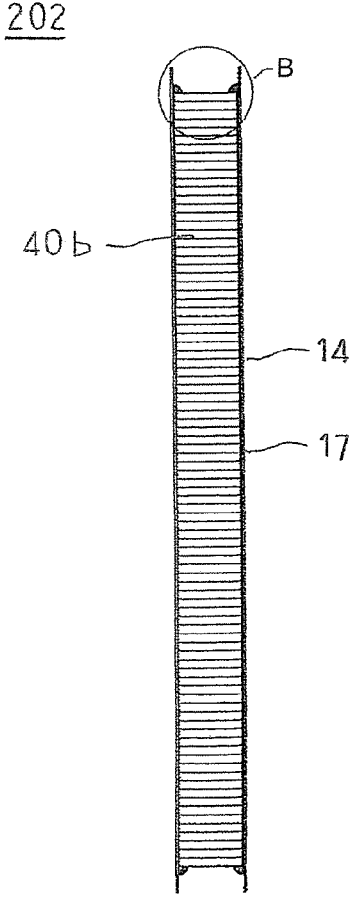
FIG. 46 is a cross section that is taken along C-C in FIG. 45 so as to be viewed in the direction of the arrows.
Figure 47:
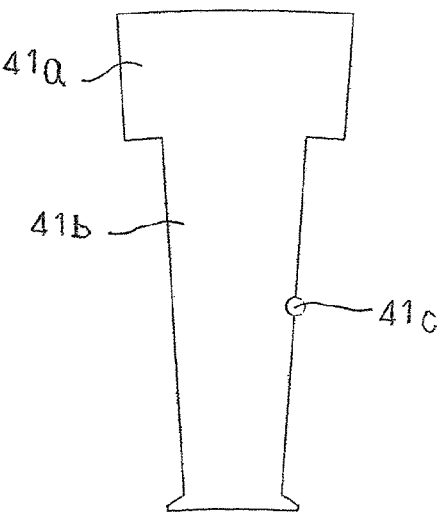
FIG. 47 is a plan that shows a first core strip that constitutes part of a core segment according to Embodiment 2 of the present invention.
Figure 48:
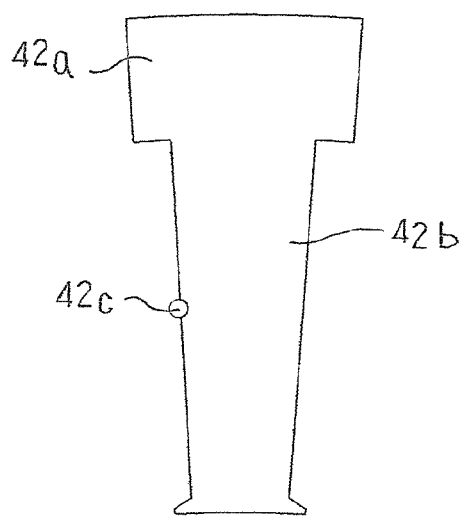
FIG. 48 is a plan that shows a second core strip that constitutes part of a core segment according to Embodiment 2 of the present invention.
Figure 49:
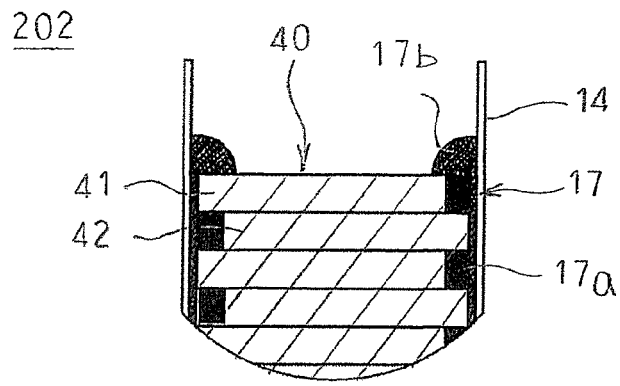
FIG. 49 is an enlargement of portion B in FIG. 46.
Figure 50:
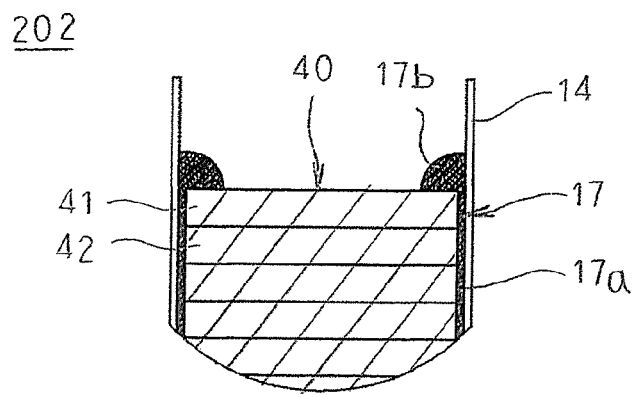
FIG. 50 is a cross section that is taken along D-D in FIG. 45 so as to be viewed in the direction of the arrows.

FIG. 45 is an end elevation that shows a laminated core according to Embodiment 2 of the present invention, FIG. 46 is a cross section that is taken along C-C in FIG. 45 so as to be viewed in the direction of the arrows, FIG. 47 is a plan that shows a first core strip that constitutes part of a core segment according to Embodiment 2 of the present invention, FIG. 48 is a plan that shows a second core strip that constitutes part of a core segment according to Embodiment 2 of the present invention, FIG. 49 is an enlargement of portion B in FIG. 46, FIG. 50 is a cross section that is taken along D-D in FIG. 45 so as to be viewed in the direction of the arrows.

In FIGS. 45 and 46, a core segment 40 is a laminated body in which first core strips 41 and second core strips 42 that are punched from a hoop material of electromagnetic steel sheet are laminated alternately. The core segment 40 is configured so as to have a T shape that is constituted by: a circular arc-shaped core back portion 40a; and a tooth portion 40b that protrudes radially inward from a central portion in a circumferential direction of the inner circumferential surface of the core back portion 40a. Electrically insulating members 14 are disposed on two circumferential sides of the tooth portion 40b. Here, base portions 14a of the electrically insulating members 14 are disposed so as to lie alongside two side surfaces of the tooth portion 40b. Folded portions 14b and 14c of the electrically insulating members 14 are disposed so as to lie alongside surfaces of a flange portion near a tip of the tooth portion 40b that face radially outward and surfaces of the core back portion 40a that face radially inward. In addition, two longitudinal end portions of the electrically insulating members 14 protrude at two axial ends of the tooth portion 40b. The electrically insulating members 14 are fixed to the two side surfaces of the tooth portion 40b by the adhesive 17 to produce a laminated core 202.

As shown in FIG. 47, the first core strips 41 are produced so as to have a T shape that includes a first core back portion 41a and a first tooth portion 41b. A first indented portion 41c is formed by indenting a radially central portion of a side surface on a first circumferential side of the first tooth portion 41b. As shown in FIG. 48, the second core strips 42 are produced so as to have a T shape that includes a second core back portion 42a and a second tooth portion 42b. A second indented portion 42c is formed by indenting a radially central portion of a side surface on a second circumferential side of the second tooth portion 42b. Moreover, the first core strips 41 and the second core strips 42 have identical shapes except that the circumferential positions of formation of the second indented portion 42c and the first indented portion 41c are different.

The core back portion 40a of the core segment 40 is configured by alternately laminating the first core back portions 41a and the second core back portions 42a, and the tooth portion 40b is configured by alternately laminating the first tooth portions 41b and the second the tooth portions 42b. As shown in FIG. 49, at a central portion in the radial direction of the tooth portion 40b, the first indented portions 41c and the second indented portions 42c are disposed so as to alternate on first and second circumferential sides in an axial direction. In other words, the first indented portions 41c and the second indented portions 42c are arranged in a column in a staggered pattern. As shown in FIG. 50, the first tooth portions 41b and the second tooth portions 42b are stacked so as to be flush with each other in other regions in the radial direction of the tooth portion 40b.

An adhesive base portion 17a is filled and cured between the tooth portion 40b and the electrically insulating members 14. The adhesive base portion 17a thereby fills the first indented portions 41c and the second indented portions 42c, as shown in FIG. 49. Hook portions 17b also protrude onto two circumferential edge portions on two axial end surfaces of the tooth portion 40b and are cured.

Moreover, Embodiment 2 is configured in a similar or identical manner to Embodiment 1 above except that the core segment 40 is used instead of the core segment 31.

Embodiment 2 is also manufactured in a similar or identical manner to Embodiment 1 except that the first indented portions 41c and the second indented portions 42c are formed simultaneously when the first core strips 41 and the second core strips 42 are punched from the electromagnetic steel sheet. Consequently, similar or identical effects to those of Embodiment 1 can also be achieved in Embodiment 2.

According to Embodiment 2, because the adhesive 17 is filled and cured in the first indented portions 41c and the second indented portions 42c, which are disposed in a staggered pattern on the tooth portion 40b, the first core strips 41 and the second core strips 42 are held more firmly by the adhesive 17, increasing the rigidity and strength of the laminated core 202.

Embodiment 3

Figure 51:
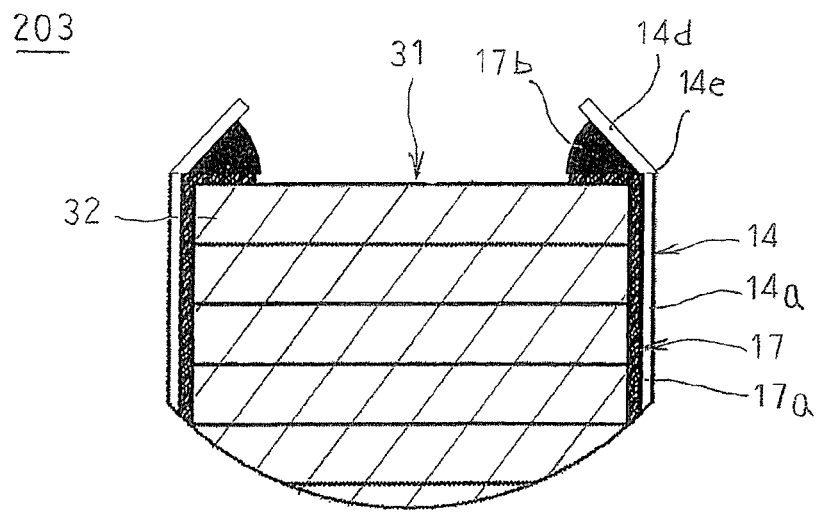
FIG. 51 is a partial cross section that shows a core segment according to Embodiment 3 of the present invention.

FIG. 51 is a partial cross section that shows a core segment according to Embodiment 3 of the present invention.

In FIG. 51, protruding portions 14d of the electrically insulating members 14 that protrude in an axially outward direction of the core segment 31 are folded at root portions 14e so as to be inclined toward a central portion in a width direction of the first tooth portion 41b.

Moreover, a remainder of the configuration is configured in a similar or identical manner to that of Embodiment 1 above.

Consequently, effects can also be achieved in Embodiment 3 in a similar or identical manner to Embodiment 1.

According to Embodiment 3, because the protruding portions 14d of the electrically insulating members 14 are folded at the root portions 14e, and are inclined toward the end surface of the tooth portion 31b, the hook portions 17b fill between the end surface of the tooth portion 31b and the protruding portions 14d. Thus, axial separation of the laminated core 203 is reliably stopped by the protruding portions 14d, effectively improving reliability.

Moreover, in Embodiment 3 above, the core segment 31 according to Embodiment 1 has been used, but similar or identical effects can be achieved even if the core segment 40 according to Embodiment 2 is used.

Embodiment 4

Figure 52:
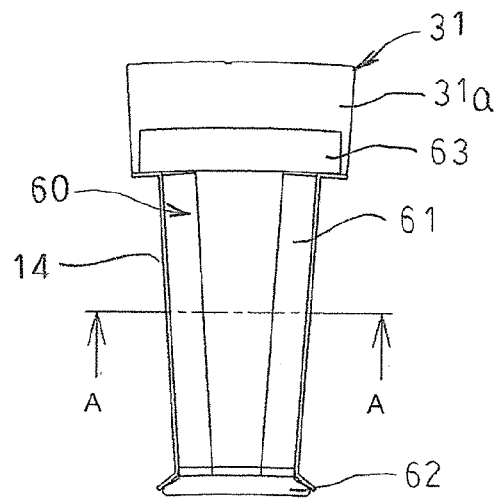
FIG. 52 is an end elevation that shows a laminated core according to Embodiment 4 of the present invention.
Figure 53:
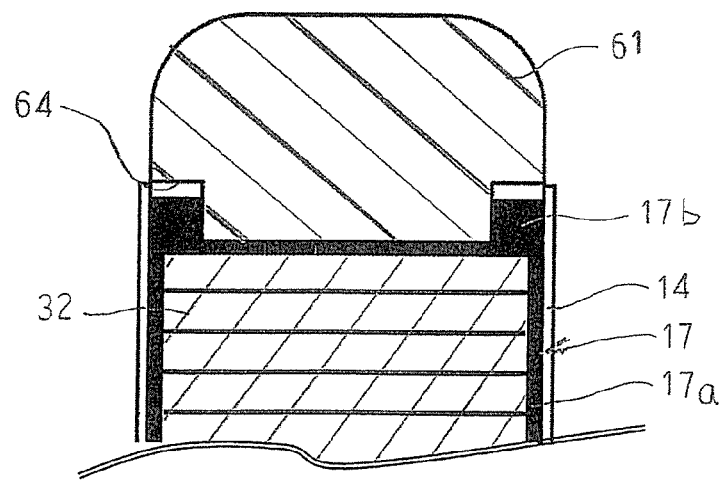
FIG. 53 is a cross section that is taken along A-A in FIG. 52 so as to be viewed in the direction of the arrows.
Figure 54:
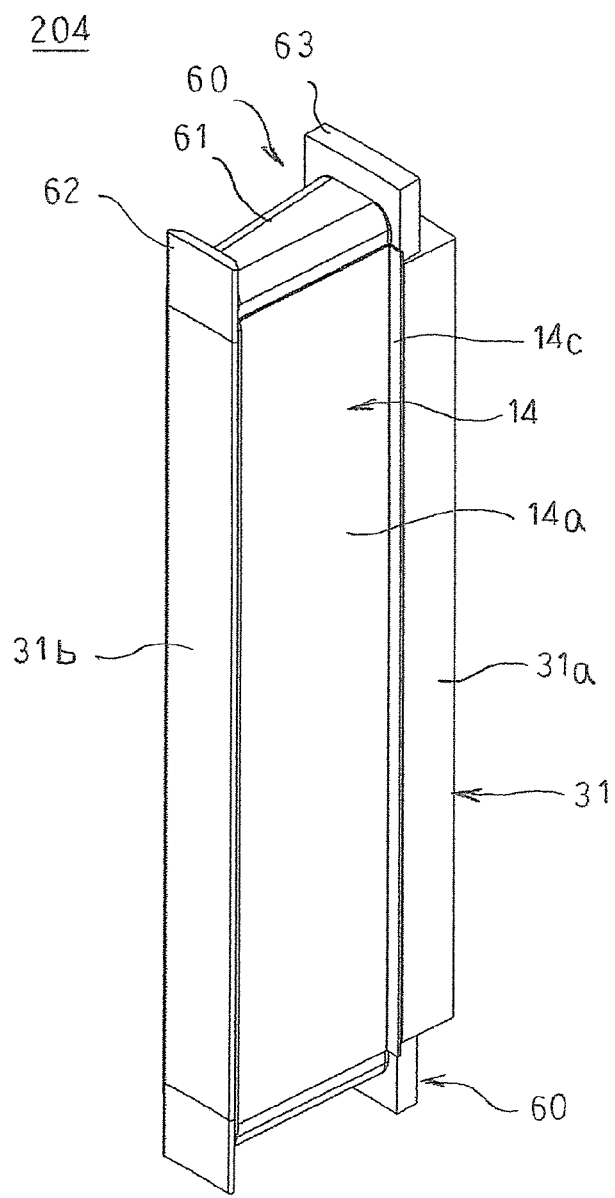
FIG. 54 is an oblique projection that shows a laminated core according to Embodiment 4 of the present invention.
Figure 55:
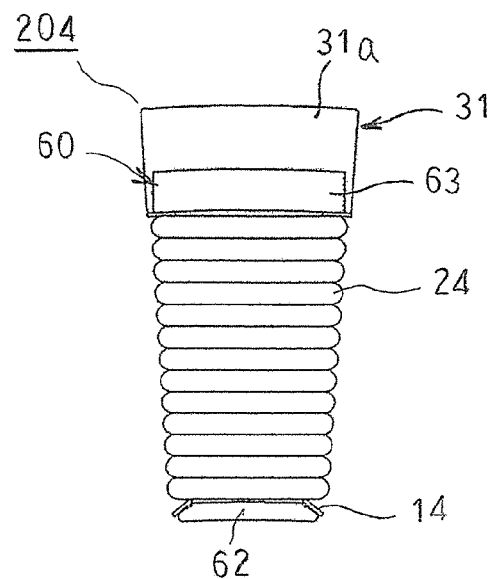
FIG. 55 is an end elevation that shows a state in which a coil is mounted to the laminated core according to Embodiment 4 of the present invention.
Figure 56:
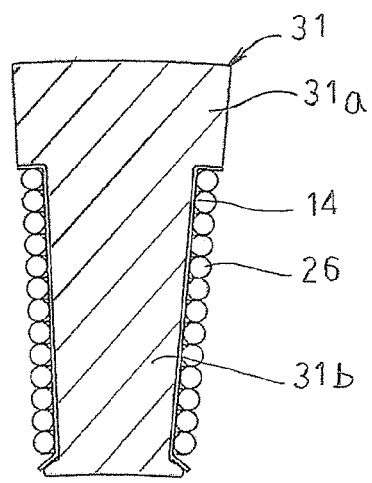
FIG. 56 is a cross section that shows the state in which the coil is mounted to the laminated core according to Embodiment 4 of the present invention.
Figure 57:
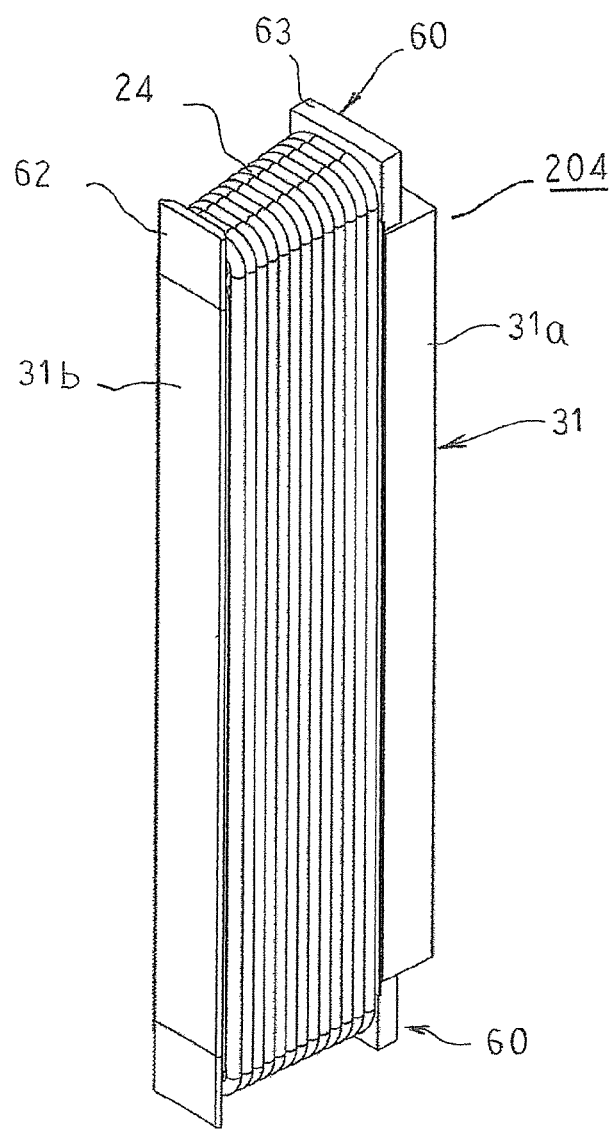
FIG. 57 is an end elevation that shows the state in which the coil is mounted to the laminated core according to Embodiment 4 of the present invention.

FIG. 52 is an end elevation that shows a laminated core according to Embodiment 4 of the present invention, FIG. 53 is a cross section that is taken along A-A in FIG. 52 so as to be viewed in the direction of the arrows, FIG. 54 is an oblique projection that shows a laminated core according to Embodiment 4 of the present invention, FIG. 55 is an end elevation that shows a state in which a coil is mounted to the laminated core according to Embodiment 4 of the present invention, FIG. 56 is a cross section that shows the state in which the coil is mounted to the laminated core according to Embodiment 4 of the present invention, and FIG. 57 is an end elevation that shows the state in which the coil is mounted to the laminated core according to Embodiment 4 of the present invention.

In FIGS. 52 through 54, bobbins 60 are made of an electrically insulating resin, and include: a drum portion 61; a first flange portion 62 that is disposed on a first longitudinal end portion of the drum portion 61; a second flange portion 63 that is disposed on a second longitudinal end portion of the drum portion 61; and adhesive accumulating portions 64 that extend longitudinally such that two edge portions in the width direction of a bottom surface of the drum portion 61 are indented.

The bobbins 60 are installed on two axial ends of a core segment 31 such that the drum portion 61 is disposed on an end surface of a tooth portion 31b of the core segment 31, the first flange portion 62 is disposed on a flange portion on a tip of the tooth portion 31b, the second flange portion 63 is disposed on an end surface of a core back portion 31a.

Electrically insulating members 14 are disposed on two circumferential sides of the tooth portion 31*b*. Here, base portions 14*a* of the electrically insulating members 14 are disposed so as to lie alongside side surfaces of the tooth portion 31*b*. Folded portions 14*b* and 14*c* of the electrically insulating members 14 are disposed so as to lie alongside surfaces of a flange portion near a tip of the tooth portion 31*b* that face radially outward and surfaces of the core back portion 31*a* that face radially inward. In addition, two longitudinal end portions of the electrically insulating members 14 protrude at two axial ends of the tooth portion 31*b*. An adhesive 17 is filled and cured between the tooth portion 31*b* and the electrically insulating members 14. Here, hook portions 17*b* are disposed inside the adhesive accumulating portions 64. In addition, the bobbins 60 are fixed to the core segment 31 by the adhesive 17 to produce a laminated core 204.

As shown in FIGS. 55 through 57, a coil 24 is a concentrated winding coil that is produced by winding a conductor wire for a set number of turns around the tooth portion 31*b*, the drum portions 61 of the pair of bobbins 60, and the pair of electrically insulating members 14, the conductor wire being made of jointless continuous copper wire or aluminum wire that is coated with an electrically insulating enamel resin.

Moreover, a remainder of the configuration is configured in a similar or identical manner to that of Embodiment 1.

Consequently, similar or identical effects to those of Embodiment 1 can also be achieved in Embodiment 4.

According to Embodiment 4, because the bobbins 60 are fixed to the core segment 31 by the adhesive 17, strength of the laminated core 204 is increased.

The adhesive accumulating portions 64 are formed on the two circumferential edge portions of the bottom surface of the drum portion 61 of the bobbins 60. The adhesive 17 that fixes the bobbins 60 to the end surfaces of the core segment 31 thereby accumulates in the adhesive accumulating portions 64, preventing overflow of the adhesive 17 onto opposite sides of the electrically insulating members 14 from the tooth portion 31*b*. Thus, the adhesive 17 does not adhere to the pressing members 34, improving maintainability.

Because the coil 24 is a concentrated winding coil, rigidity of the laminated core 204 is increased.

Moreover, in Embodiment 4 above, a core segment from Embodiment 1 has been used, but similar or identical effects can be achieved even if a core segment from another Embodiment is used.

In Embodiment 4 above, bobbins are fixed to the two end surfaces of the core segment using an adhesive, but bobbins may be fixed to the two end surfaces of the core segment using a pressure-sensitive adhesive, or using a pressure-sensitive adhesive and an adhesive in combination.

Embodiment 5

Figure 58:
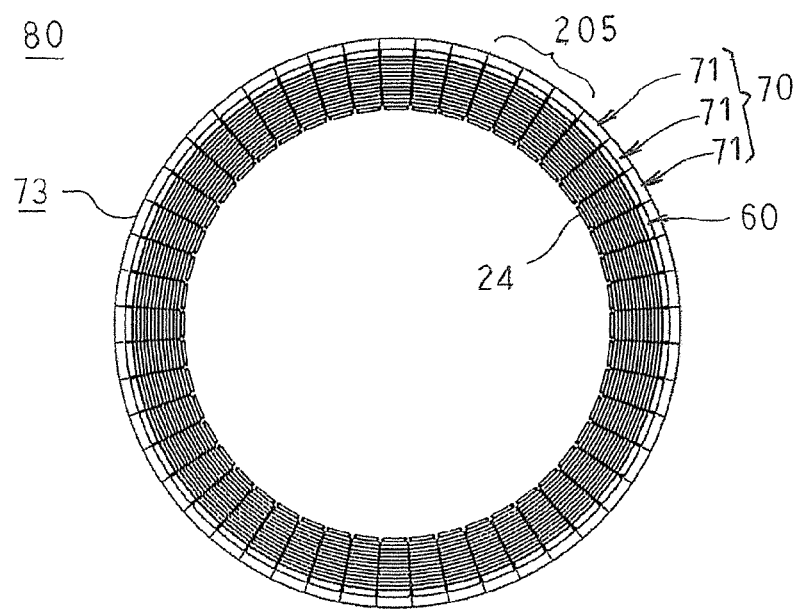
FIG. 58 is an end elevation that shows an armature that uses the laminated core according to Embodiment 5 of the present invention.
Figure 59:
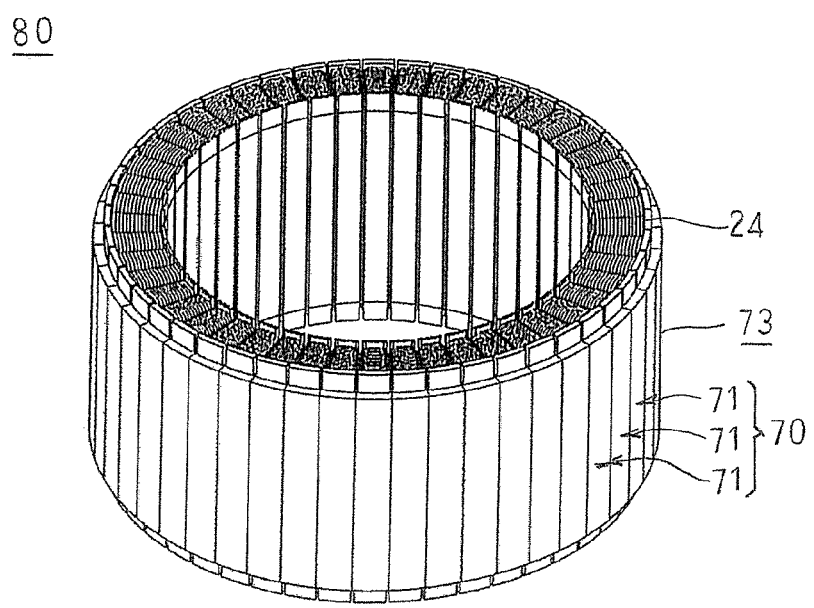
FIG. 59 is an oblique projection that shows the armature that uses the laminated core according to Embodiment 5 of the present invention.
Figure 60:
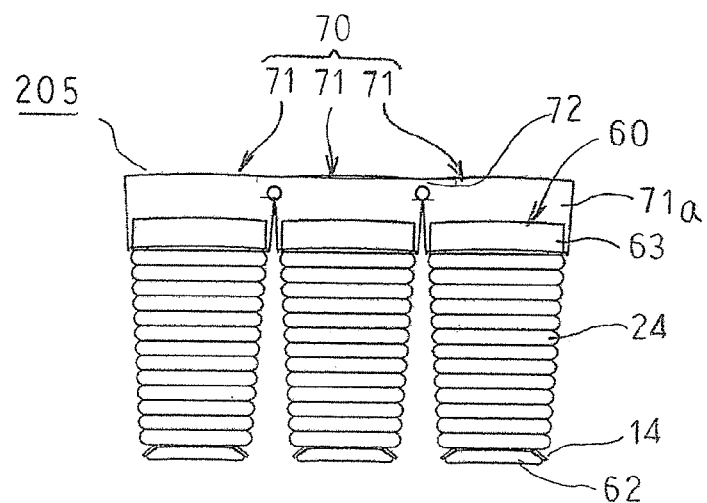
FIG. 60 is a plan that shows a state in which coils are mounted to the laminated core according to Embodiment 5 of the present invention.
Figure 61:
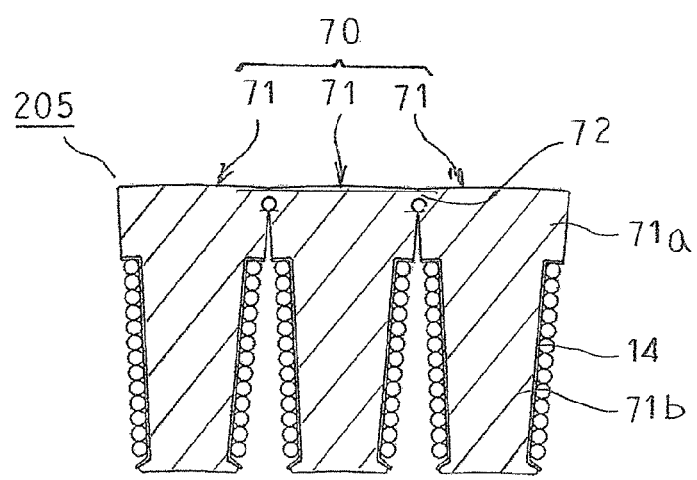
FIG. 61 is a cross section that shows the state in which the coils are mounted to the laminated core according to Embodiment 5 of the present invention.

FIG. 58 is an end elevation that shows an armature that uses the laminated core according to Embodiment 5 of the present invention, FIG. 59 is an oblique projection that shows an armature that uses the laminated core according to Embodiment 5 of the present invention, FIG. 60 is a plan that shows a state in which coils are mounted to the laminated core according to Embodiment 5 of the present invention, and FIG. 61 is a cross section that shows a state in which the coils are mounted to the laminated core according to Embodiment 5 of the present invention.

In FIGS. 60 and 61, a core segment 70 is constituted by three T-shaped core blocks 71 that are each constituted by: a circular arc-shaped core back portion 71*a*; and a tooth portion 71*b* that protrudes toward a radially inner side from a circumferentially central portion of an inner circumferential surface of the core back portion 71*a*, the three T-shaped core blocks 71 being configured by flexibly linking together outer circumferential edges of circumferential side surfaces of the core back portion 71*a* at thin linking portions 72. The core segment 70 is a laminated body that is configured by laminating a set number of core strips that are punched from an electromagnetic steel sheet.

Bobbins 60 are installed on two axial ends of each of the core blocks 71 in a similar manner to Embodiment 4. Electrically insulating members 14 are disposed on two circumferential sides of the tooth portions 71*b* of each of the core blocks 71. Here, base portions 14*a* of the electrically insulating members 14 are disposed so as to lie alongside side surfaces of each tooth portion 71*b*. Folded portions 14*b* and 14*c* of the electrically insulating members 14 are disposed so as to lie alongside surfaces of a flange portion near a tip of each tooth portion 71*b* that face radially outward and surfaces of each core back portion 71*a* that face radially inward. In addition, two longitudinal end portions of the electrically insulating members 14 protrude at two axial ends of each tooth portion 71*b*. An adhesive 17 is filled and cured between the tooth portions 71*b* and the electrically insulating members 14 to produce a laminated core 205. A coil 24 is mounted to each of the core blocks 71 by winding a conductor wire for a set number of turns around the tooth portion 71*b*, the drum portions 61 of the pair of bobbins 60, and the pair of electrically insulating members 14.

Here, to assemble the armature 80, the three core blocks 71 of the core segment 70 are first opened out rectilinearly by bending them at the thin linking portions 72, and the bobbins 60 and the electrically insulating members 14 are mounted onto each of the core blocks 71, to produce the laminated core 205. Next, the coils 24 are mounted onto each of the core blocks 71. Next, the circumferential side surfaces of the core back portion 71*a* are pressed against each other by bending them at the thin linking portions 72, to form the three core blocks 71 of the laminated core 205 into a circular arc shape. Next, sixteen of the circular arc-shaped laminated cores 205 are arranged into an annular shape by butting the circumferential side surfaces of the core back portions 71*a* together to produce an inner core 73. Next, the inner core 73 is housed and held inside an outer core (not shown) by press-fitting, shrink-fitting, etc., to assemble an armature 80, which is shown in FIGS. 58 and 59.

An armature core is configured by housing and holding the inner core 73 inside the outer core. The armature core that is assembled in this manner is configured in a similar or identical manner to the armature core 11 according to Embodiment 1.

Because this core segment 70 is a structural body in which three core blocks 71 are linked by thin linking portions 72, reducing the number of parts that constitute the armature core, productivity is increased.

Moreover, in Embodiment 5 above, the core segment 70 is configured by linking three core blocks 71 by thin linking portions 72, but the number of linked core blocks 71 is not limited to three.

In Embodiment 5 above, the core blocks 71 are configured in a similar manner to the core segments 31, but the core blocks 71 may be configured in a similar manner to the core segments 40.

Embodiment 6

Figure 62:
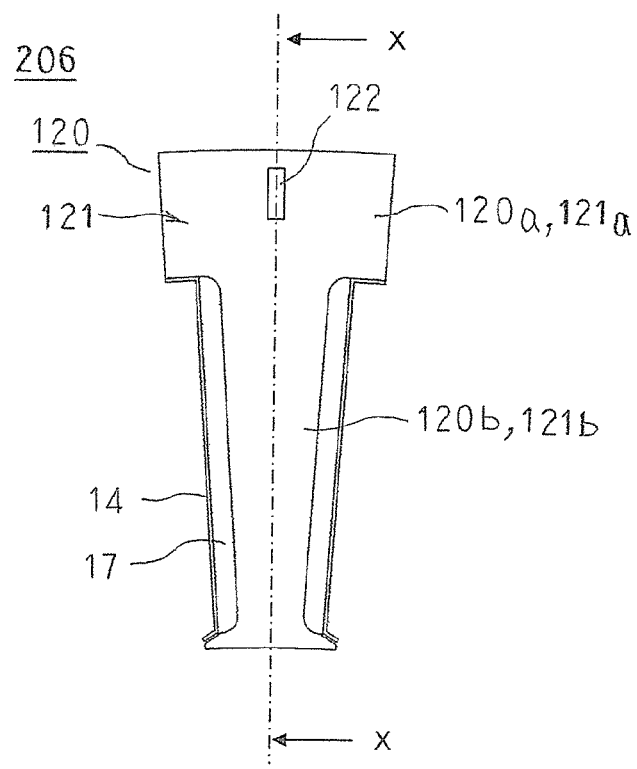
FIG. 62 is an end elevation that shows a laminated core in a rotary electric machine according to Embodiment 6 of the present invention when viewed from axially outside.
Figure 63:
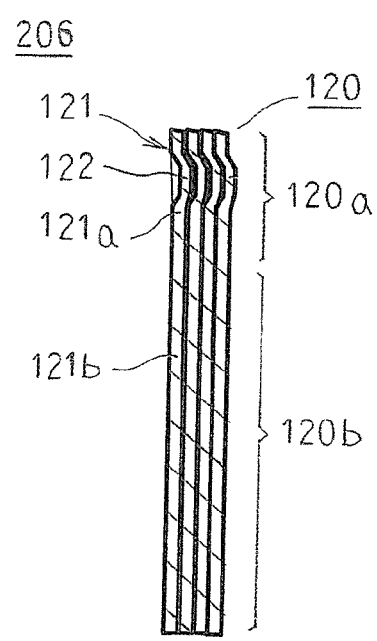
FIG. 63 is a cross section that is taken along X-X in FIG. 62 so as to be viewed in the direction of the arrows.

FIG. 62 is an end elevation that shows a laminated core in a rotary electric machine according to Embodiment 6 of the present invention when viewed from axially outside, and FIG. 63 is a cross section that is taken along X-X in FIG. 62 so as to be viewed in the direction of the arrows.

In FIGS. 62 and 63, a core segment 120 is a laminated body in which core strips 121 that are punched from a hoop material of electromagnetic steel sheet are laminated. The core segment 120 is configured so as to have a T shape that is constituted by: a circular arc-shaped core back portion 120a; and a tooth portion 120b that protrudes radially inward from a central portion in a circumferential direction of the inner circumferential surface of the core back portion 120a. Electrically insulating members 14 are disposed on two circumferential sides of the tooth portion 120b. Here, base portions 14a of the electrically insulating members 14 are disposed so as to lie alongside two side surfaces of the tooth portion 120b. Folded portions 14b and 14c of the electrically insulating members 14 are disposed so as to lie alongside surfaces of a flange portion near a tip of the tooth portion 120b that face radially outward and surfaces of the core back portion 120a that face radially inward. In addition, two longitudinal end portions of the electrically insulating members 14 protrude at two axial ends of the tooth portion 120b. The electrically insulating members 14 are fixed to the two side surfaces of the tooth portion 120b by the adhesive 17 to produce a laminated core 206.

The core strips 121 are formed so as to have a T shape that is constituted by a core back portion 121a and a tooth portion 121b. A crimping portion 122 is formed on a central portion of the core back portion 121a. The core back portion 120a of the core segment 120 is configured by laminating the core back portions 121a of the core strips 121. The tooth portion 120b of the core segment 120 is configured by laminating the tooth portions 121b of the core strips 121. The laminated core strips 121 are linked to each other by pushing a protruding portion of the crimping portion 122 that is formed on a first core back portion 121a into an indented portion of the crimping portion 122 of a second core back portion 121a that is adjacent in the direction of lamination. In other words, the core strips 121 are held in a laminated state by fitting the crimping portions 122 together.

Embodiment 6 is configured in a similar or identical manner to Embodiment 1 above except that the crimping portions 122 are formed on the core back portions 121a of the core strips 121. Consequently, similar or identical effects to those of Embodiment 1 can also be achieved in Embodiment 6.

According to Embodiment 6, because the core strips 121 that constitute the core segment 120 are linked by fitting together of the crimping portions 122 in addition to the adhesive 17, mechanical strength of the laminated core 206 is increased. Deformation of an inner core in which laminated cores 206 are arranged into an annular shape is thereby suppressed when the inner core is inserted inside an outer core and held by press-fitting or shrinkage-fitting.

Here, it is desirable to form the crimping portions 122 on a radially outer side of the core back portion 120a of the core segment 120. Because the crimping portions 122 are thereby formed on the radially outer side of the core back portion 120a where changes in magnetic flux are small, efficiency of the rotary electric machine can be improved. Furthermore, by positioning the crimping portions 122 on the radially outer side of the core back portion 120a, a vicinity of a tip of the tooth portion 120b deforms more easily in an axial direction. However, because the tooth portion 120b is held by the electrically insulating members 14 by means of the adhesive 17, axial deformation in the vicinity of the tip of the tooth portion 120b is suppressed, suppressing vibration and noise.

In Embodiment 6, the crimping portions 122 are formed on the core strips 121 in a step of punching the core strips 121 from a hoop material. The punched core strips 121 are laminated within an aligning portion in an aligned state due to the crimping portions 122 being stacked together in the direction of lamination. The crimping portions 122 are fitted together with each other by pushing the punched core strips 121 into the aligning portion. The core strips 121 are thereby integrated, that is, are held in a laminated state. Thus, the laminated body gripping step in FIG. 23 can be omitted, enabling productivity of the rotary electric machine to be improved.

Moreover, in Embodiment 6, crimping portions are formed on the core back portion of core strips from Embodiment 1, the laminated core strips being fixed by crimping, but crimping portions may be formed on the core back portion of core strips from other embodiments, the laminated core strips being fixed by crimping.

Embodiment 7

Figure 64:
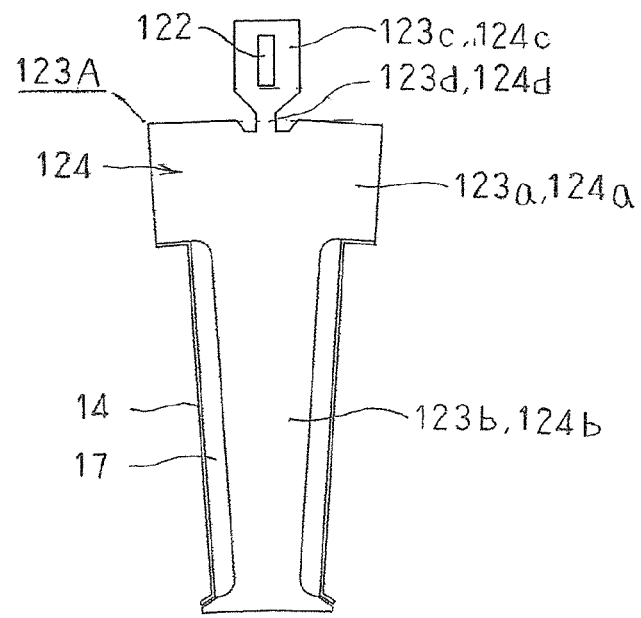
FIG. 64 is an end elevation that shows a state of a laminated core in a rotary electric machine according to Embodiment 7 of the present invention before removing an attitude holding portion when viewed from axially outside.
Figure 65:
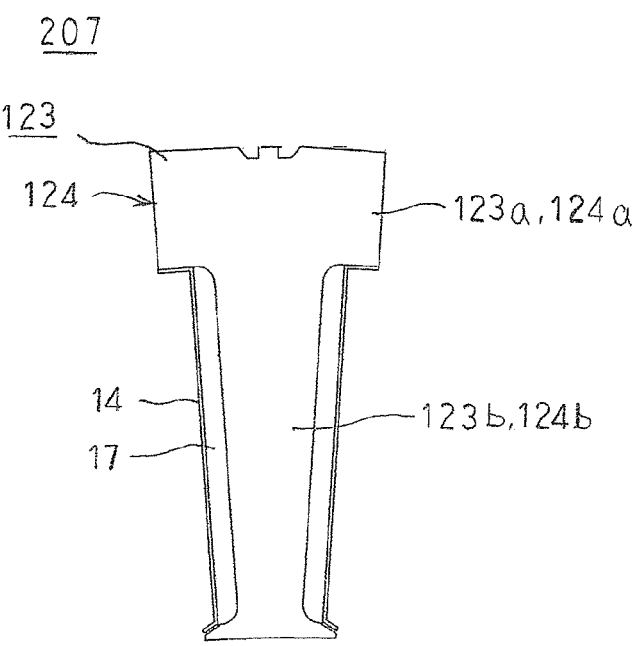
FIG. 65 is an end elevation that shows the laminated core in the rotary electric machine according to Embodiment 7 of the present invention when viewed from axially outside.

FIG. 64 is an end elevation that shows a state of a laminated core in a rotary electric machine according to Embodiment 7 of the present invention before removing an attitude holding portion when viewed from axially outside, and FIG. 65 is an end elevation that shows the laminated core in the rotary electric machine according to Embodiment 7 of the present invention when viewed from axially outside.

In FIG. 64, a core segment 123A is a laminated body in which core strips 124 that are punched from a hoop material of electromagnetic steel sheet are laminated. The core segment 123A is constituted by: a circular arc-shaped core back portion 123a; a tooth portion 123b that protrudes radially inward from a central portion in a circumferential direction of the inner circumferential surface of the core back portion 123a; an attitude holding portion 123c that is positioned on a radially outer side of the core back portion 123a; and a thin portion 123d that links the core back portion 123a and the attitude holding portion 123c. Electrically insulating members 14 are disposed on two circumferential sides of the tooth portion 123b. Here, base portions 14a of the electrically insulating members 14 are disposed so as to lie alongside two side surfaces of the tooth portion 123b. Folded portions 14b and 14c of the electrically insulating members 14 are disposed so as to lie alongside surfaces of a flange portion near a tip of the tooth portion 123b that face radially outward and surfaces of the core back portion 123a that face radially inward. In addition, two longitudinal end portions of the electrically insulating members 14 protrude at two axial ends of the tooth portion 123b. The electrically insulating members 14 are fixed to the two side surfaces of the tooth portion 123b by the adhesive 17, and then the attitude holding portion 123c is cut and removed at the thin portion 123d shown in FIG. 65, to produce a laminated core 207.

The core strips 124 include a core back portion 124a, a tooth portion 124b, and an attitude holding portion 124c. The attitude holding portion 124c is linked to the core back portion 124a by means of a thin portion 124d. A crimping portion 122 is formed on a central portion of the attitude holding portion 124c. The core back portion 123a of the core segment 123A is configured by laminating the core back portions 124a of the core strips 124. The tooth portion 123b of the core segment 123A is configured by laminating the tooth portions 124b of the core strips 124. The attitude holding portion 123c of the core segment 123A is configured by laminating the attitude holding portions 124c of the core strips 124. The thin portion 123d of the core segment 123A is configured by laminating the thin portions 124d of the core strips 124.

The core segment 123A is held in a laminated state by fitting together the crimping portions 122 that are formed on adjacent attitude holding portions 123c in the direction of lamination. The electrically insulating members 14 are fixed to the two side surfaces of the tooth portion 123b of the core segment 123A by the adhesive 17, to integrate the core segment 123A. The attitude holding portion 123c is subsequently cut and removed at the thin portion 123d, to produce the laminated core 207. A core segment 123 is formed by removing the attitude holding portion 123c from the core segment 123A.

Embodiment 7 is configured in a similar or identical manner to Embodiment 1 above except that the core strips 124 include attitude holding portion portions 123c that protrude radially outward from the core back portions 123a, and crimping portions 122 are formed on the attitude holding portion portions 123c. Consequently, similar or identical effects to those of Embodiment 1 can also be achieved in Embodiment 7.

In Embodiment 7, the core segment 123A is held in a laminated state by the interfitting of the crimping portions 122 that are formed on the attitude holding portion 123c. Thus, in Embodiment 7, the laminated body gripping step in FIG. 23 can also be omitted in a similar or identical manner to Embodiment 6, enabling productivity of the rotary electric machine to be improved. Because the crimping portions 122 are removed together with the attitude holding portion 123c, the crimping portions 122 are not present in the magnetic path of the core segment 123, enabling increased efficiency to be achieved in the rotary electric machine.

Moreover, in Embodiment 7, attitude holding portions that include crimping portions are formed on core back portions of core strips from Embodiment 1, the laminated core strips being fixed by crimping, but attitude holding portions that include crimping portions may be formed on core back portions of core strips from other embodiments, the laminated core strips being fixed by crimping.

Embodiment 8

Figure 66:
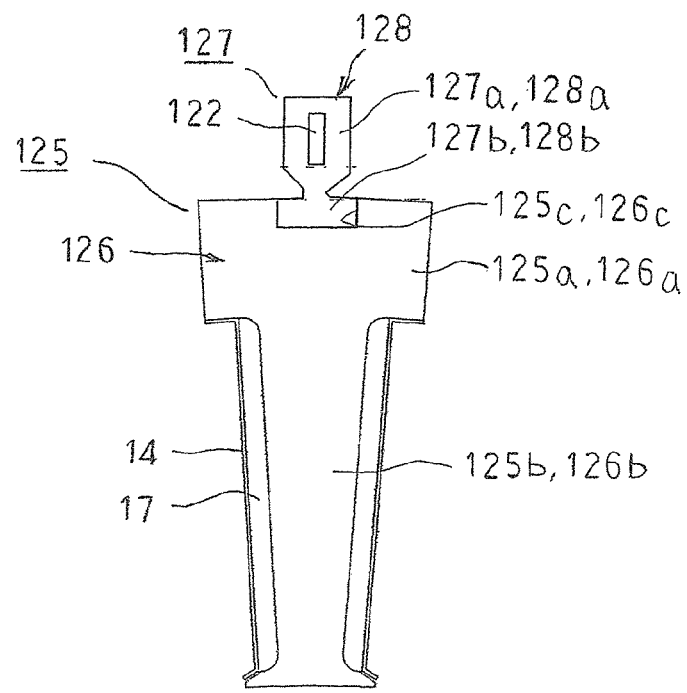
FIG. 66 is an end elevation that shows a state of a laminated core in a rotary electric machine according to Embodiment 8 of the present invention before removing an attitude holding portion when viewed from axially outside.
Figure 67:
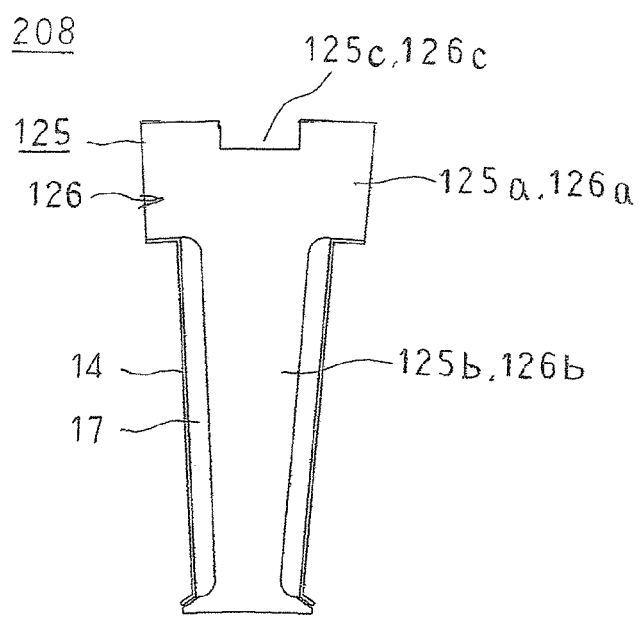
FIG. 67 is an end elevation that shows a laminated core in a rotary electric machine according to Embodiment 8 of the present invention when viewed from axially outside.

FIG. 66 is an end elevation that shows a state of a laminated core in a rotary electric machine according to Embodiment 8 of the present invention before removing an attitude holding portion when viewed from axially outside, and FIG. 67 is an end elevation that shows a laminated core in a rotary electric machine according to Embodiment 8 of the present invention when viewed from axially outside.

In FIG. 66, a core segment 125 is a laminated body in which core strips 126 that are punched from a hoop material of electromagnetic steel sheet are laminated. The core segment 125 is constituted by: a circular arc-shaped core back portion 125a; a tooth portion 125b that protrudes radially inward from a central portion in a circumferential direction of the inner circumferential surface of the core back portion 125a; and an interfitting indented portion 125c in which a radially outer side of the core back portion 125a is indented. An attitude holding member 127 is a laminated body in which holding strips 128 that are punched from a hoop material of magnetic steel sheet are laminated, and includes: an attitude holding portion 127a, and an interfitting protruding portion 127b. The attitude holding member 127 is linked to the core segment 125 by fitting the interfitting protruding portion 127b into the interfitting indented portion 125c.

Electrically insulating members 14 are disposed on two circumferential sides of the tooth portion 125b. Here, base portions 14a of the electrically insulating members 14 are disposed so as to lie alongside two side surfaces of the tooth portion 125b. Folded portions 14b and 14c of the electrically insulating members 14 are disposed so as to lie alongside surfaces of a flange portion near a tip of the tooth portion 125b that face radially outward and surfaces of the core back portion 125a that face radially inward. In addition, two longitudinal end portions of the electrically insulating members 14 protrude at two axial ends of the tooth portion 125b. The electrically insulating members 14 are fixed to the two side surfaces of the tooth portion 125b by the adhesive 17, and then the attitude holding member 125c is removed as shown in FIG. 67, to produce a laminated core 208.

The core strips 126 include a core back portion 126a, a tooth portion 126b, and an interfitting indented portion 126c. The holding strips 128 include an attitude holding portion 128a, and an interfitting protruding portion 128b. A crimping portion 122 is formed at a central portion of the attitude holding portion 128a. The core strips 126 and the holding strips 128 are punched out of a hoop material of magnetic steel sheet and laminated in a state in which the interfitting protruding portion 128b and the interfitting indented portion 126c are fitted together. The laminated holding strips 128 are linked to each other by fitting the crimping portions 122 together. The holding strips 128 are held in a laminated state to form the attitude holding member 127. The core strips 126 of the core segment 125 that are fitted together with the attitude holding member 127 are thereby held in a laminated state.

Here, the core back portion 125a of the core segment 125 is configured by laminating the core back portions 126a of the core strips 126. The tooth portion 125b of the core segment 125 is configured by laminating the tooth portions 126b of the core strips 126. The interfitting indented portion 125c of the core segment 125 is configured by laminating the interfitting indented portions 126c of the core strips 126. The attitude holding portion 127a of the attitude holding member 127 is configured by laminating the attitude holding portions 128a of the holding strips 128. The interfitting protruding portion 127b of the attitude holding member 127 is configured by laminating the interfitting protruding portions 128b of the holding strips 128.

The electrically insulating members 14 is fixed to two side surfaces of the tooth portion 125b of the core segment 125 by an adhesive 17 to integrate the core segment 125. The attitude holding member 127 is subsequently removed from the core segment 125 to produce the laminated core 208. The core strips 126 that constitute the core segment 125 are linked to each other by the electrically insulating members 14 and the adhesive 17.

Embodiment 8 is configured in a similar or identical manner to Embodiment 1 above except that the core strips 126 are laminated together with holding strips 48 that include crimping portions 122 so as to be fitted together and held by the holding strips 128. Consequently, similar or identical effects to those of Embodiment 1 can also be achieved in Embodiment 8.

In Embodiment 8, the laminated holding strips 128 are linked to each other by fitting the crimping portions 122 together, to form the attitude holding member 127. The core segment 125, which is a laminated body of the core strips 126, is held in a laminated state by the attitude holding member 127. Thus, in Embodiment 8, the laminated body gripping step in FIG. 23 can also be omitted in a similar or identical manner to Embodiment 6, enabling productivity of the rotary electric machine to be improved. Because the crimping portions 122 are removed together with the attitude holding member 127, the crimping portions 122 are not present in the magnetic path of the core segment 125, enabling increased efficiency to be achieved in the rotary electric machine.

The core segment 125 and the attitude holding member 127 are linked by interfitting between the interfitting protruding portion 127b and the interfitting indented portion 125c. Because the attitude holding member 127 can thereby be removed without cutting after the electrically insulating members 14 are fixed to the core segment 125 by the adhesive 17, productivity is improved.

Moreover, in Embodiment 8, interfitting indented portions are disposed on core back portions of core strips that constitute a core segment from Embodiment 1, and interfitting protruding portions are disposed on holding strips that include crimping portions, but interfitting indented portions may be disposed on core back portions of core strips that constitute core segments from other embodiments, and interfitting protruding portions disposed on holding strips that include crimping portions.

Embodiment 9

Figure 68:
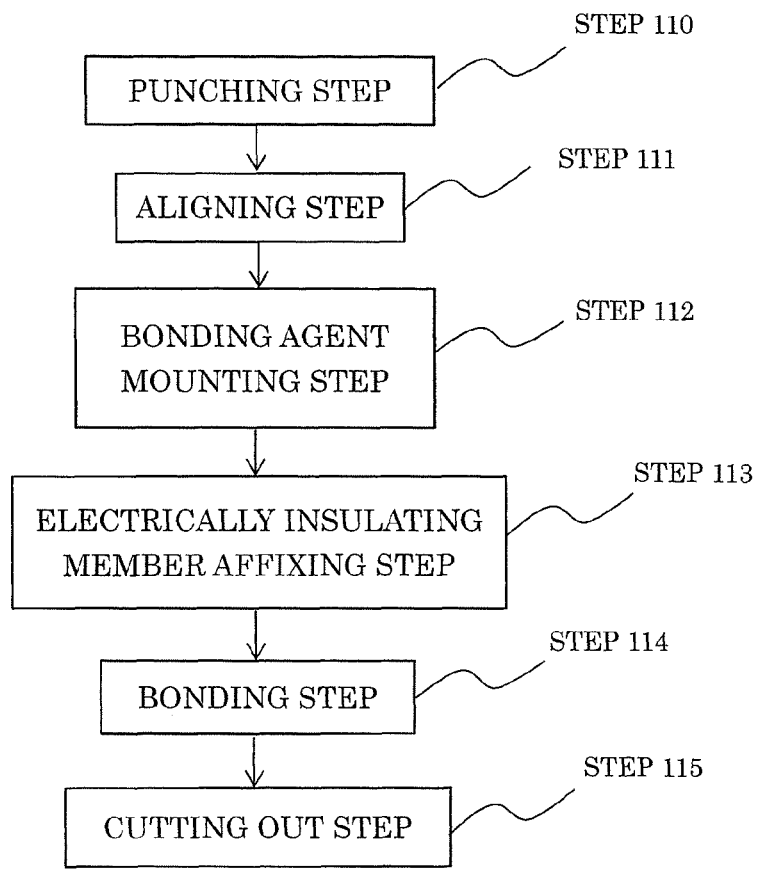
FIG. 68 is a flow diagram that explains a laminated core manufacturing method according to Embodiment 9 of the present invention.
Figure 69:
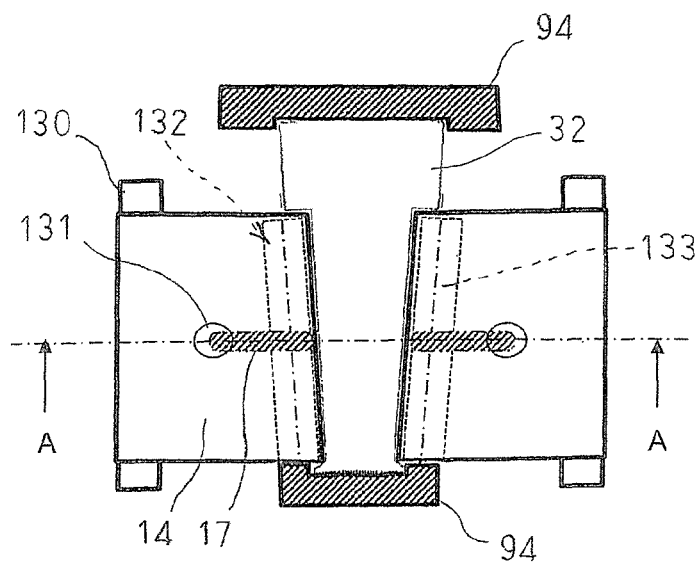
FIG. 69 is a schematic diagram that shows a manufacturing apparatus for a laminated core according to Embodiment 9 of the present invention viewed from a punching direction.
Figure 70:
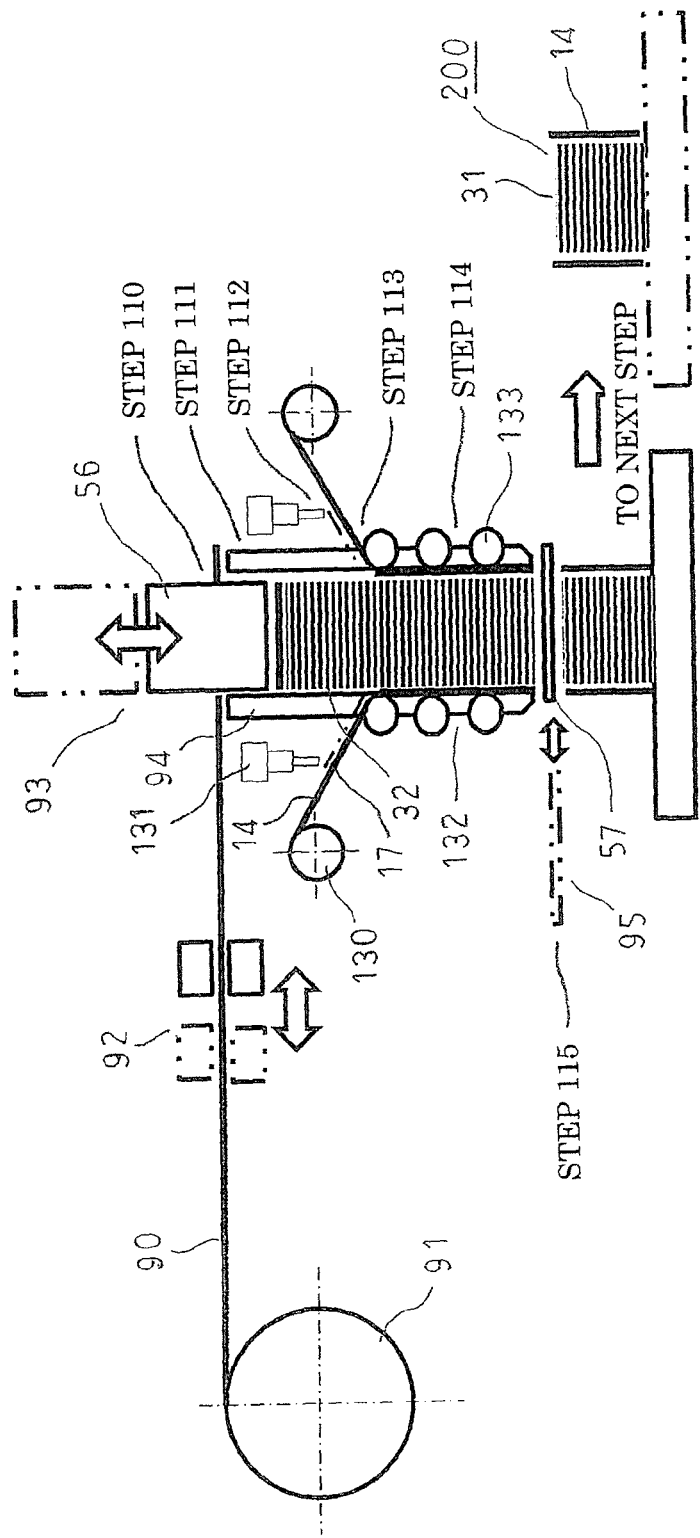
FIG. 70 is a schematic diagram that shows the manufacturing apparatus for the laminated core according to Embodiment 9 of the present invention viewed from a direction that is perpendicular to the punching direction.

FIG. 68 is a flow diagram that explains a laminated core manufacturing method according to Embodiment 9 of the present invention, FIG. 69 is a schematic diagram that shows a manufacturing apparatus for a laminated core according to Embodiment 9 of the present invention viewed from a punching direction, and FIG. 70 is a schematic diagram that shows the manufacturing apparatus for the laminated core according to Embodiment 9 of the present invention viewed from a direction that is perpendicular to the punching direction. Moreover, FIG. 70 shows inside a die of a manufacturing apparatus as a cross section that is taken along A-A in FIG. 69 so as to be viewed in the direction of the arrows.

In Embodiment 1, a laminated body of a set number of core strips 32 that were aligned inside a die was cut out, and electrically insulating members 14 were affixed to the laminated body. In Embodiment 9, a series of steps including aligning punched core strips 32, affixing electrically insulating members 14 to a laminated body of the aligned core strips 32, and curing an adhesive 17, are performed inside a die.

In Embodiment 9, a hoop material 90 that is supplied from a material supplying portion 91 is fed to a punching portion 93 at a set pitch by a material feeding portion 92. At the punching portion 93, T-shaped core strips 32 are punched out of the hoop material 90 by a punching member 56 (Step 110: punching step). The punched core strips 32 are pushed out downward in a laminated state, and are inserted into an aligning portion 94 that is disposed below the punching portion 93. The core strips 32 are laminated in an aligned state by being inserted into the aligning portion 94 (Step 111: aligning step). Next, electrically insulating members 14 are supplied continuously from an electrically insulating member supplying portion 130 to the aligning portion 94. An adhesive 17 in liquid form is applied to the electrically insulating members 14 by an adhesive applying portion 131 before reaching the aligning portion 94 (Step 112: bonding agent mounting step).

An electrically insulating member pressing portion 132 is configured such that a plurality of pressure rollers 133 are arranged in a direction of lamination of the core strips 32, in other words, vertically, so as to face each of two side surfaces of tooth portions of the core strips 32. The electrically insulating members 14 are affixed to the side surfaces of the core strips 32 by being clamped between the side surfaces of the core strips 32 and the uppermost position of the pressure rollers 133 (Step 113: electrically insulating member affixing step). The electrically insulating members 14 that are affixed to the side surfaces of the core strips 32 descend together with the core strips 32, and are pressed against the side surfaces of the core strips 32 as they pass the pressure rollers 133. In the process of the electrically insulating members 14 that are affixed to the side surfaces of the core strips 32 descending through the electrically insulating member pressing portion 132 together with the core strips 32, the adhesive 17 is cured, and the laminated core strips 32 and the electrically insulating members 14 are bonded together (Step 114: bonding step).

When a set number of the core strips 32 have descended, a laminated body of the core strips 32 that is fixed by the adhesive 17 is separated by a cutting out member 57 in a cutting out portion 95 (Step 115: cutting out step). In the cutting out step, a laminated core 200 in which electrically insulating members 14 are fixed to the two side surfaces of the tooth portion 31b of the core segment 31 by the adhesive 17 is cut out. The laminated core 200 that is cut out is conveyed to the next step.

Thus, according to Embodiment 9, because the step of aligning the core strips 32, the step of affixing the electrically insulating members 14, and the step of curing the adhesive 17 are performed inside the die, the number of units of equipment can be reduced, and productivity can also be improved. Because the adhesive 17 is pressed onto the core strips 32 by means of the electrically insulating members 14, the adhesive 17 does not adhere to equipment such as the die, improving maintainability.

Moreover, in Embodiment 9 above, a case in which the laminated core 200 from Embodiment 1 is manufactured has been explained, but this can also be applied to cases in which laminated cores according to other embodiments are manufactured.

In Embodiment 9 above, a case in which an adhesive 17 in liquid form is used has been explained, but an adhesive in film form may be used.

In Embodiment 9 above, the adhesive 17 is applied to the electrically insulating members 14 in a conveying pathway between an electrically insulating member supplying portion and an aligning portion, but electrically insulating members 14 to which the adhesive 17 has been applied in advance may alternatively be supplied to the electrically insulating member supplying portion 130.

Embodiment 10

Figure 71:
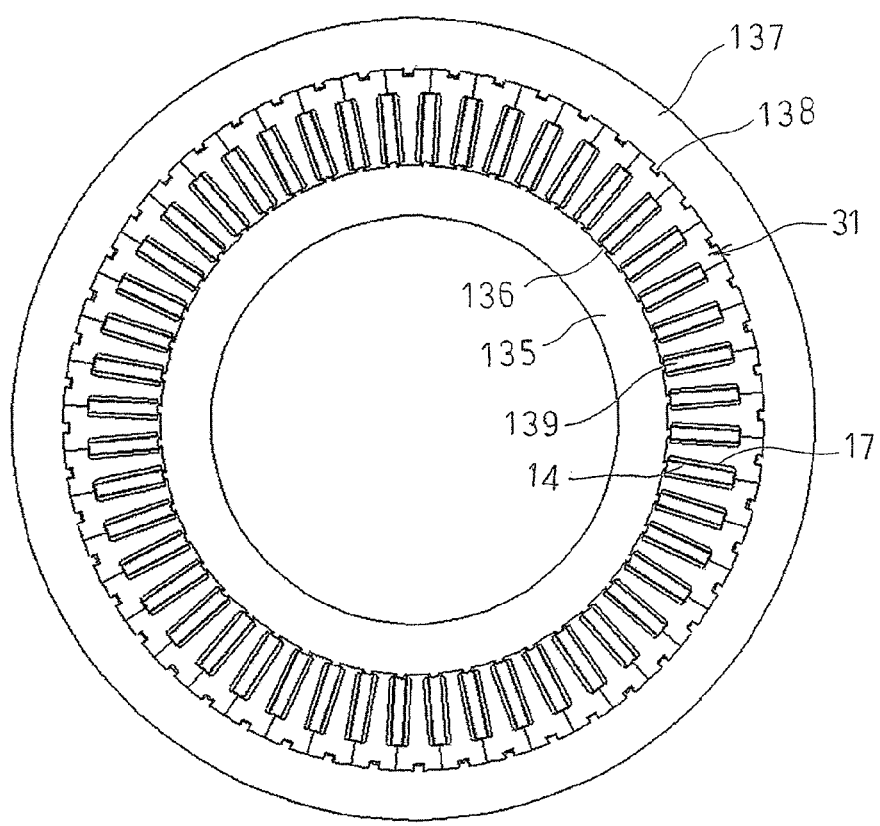
FIG. 71 is an end elevation that shows a state in which core segments are disposed in a single circular shape in ring members in a laminated core manufacturing method according to Embodiment 10 of the present invention.
Figure 72:
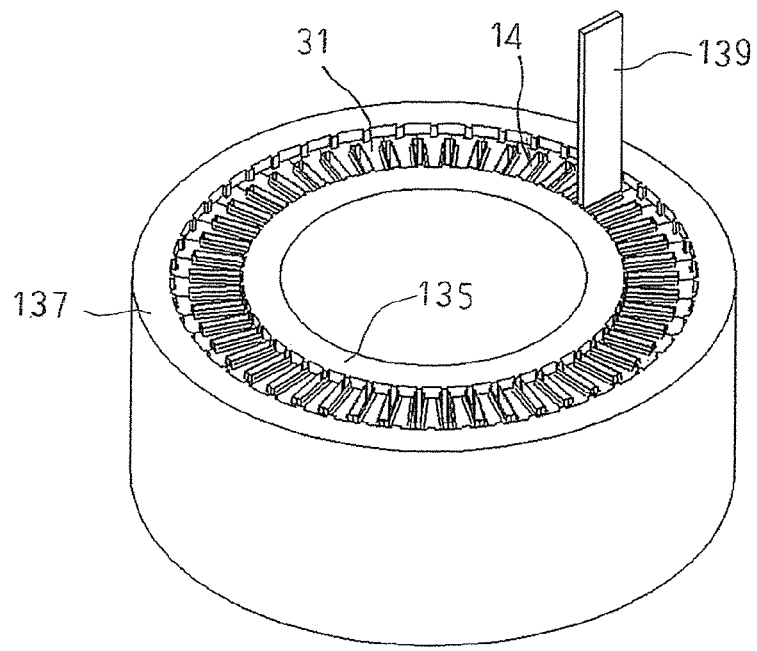
FIG. 72 is an oblique projection that explains a step of mounting an electrically insulating member pressing member in the laminated core manufacturing method according to Embodiment 10 of the present invention.
Figure 73:
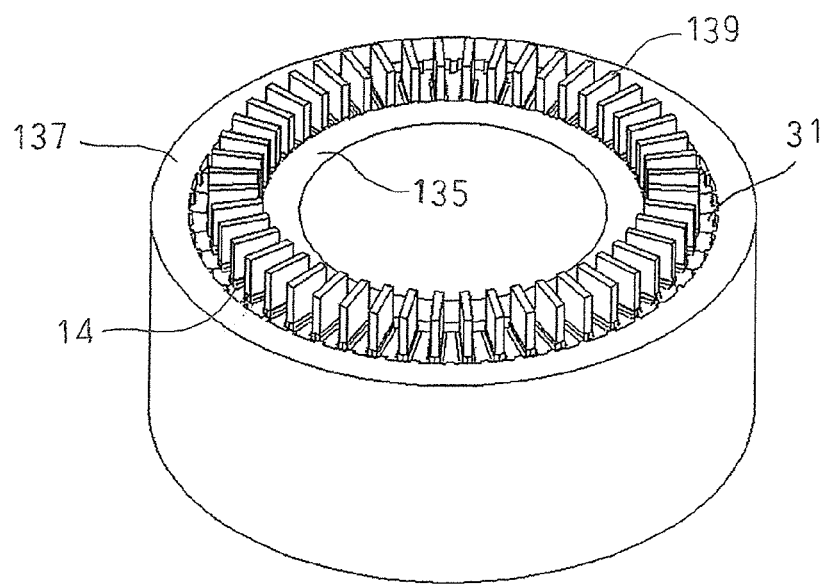
FIG. 73 is an oblique projection that shows a state in which electrically insulating member pressing members are mounted in the laminated core manufacturing method according to Embodiment 10 of the present invention.
Figure 74:
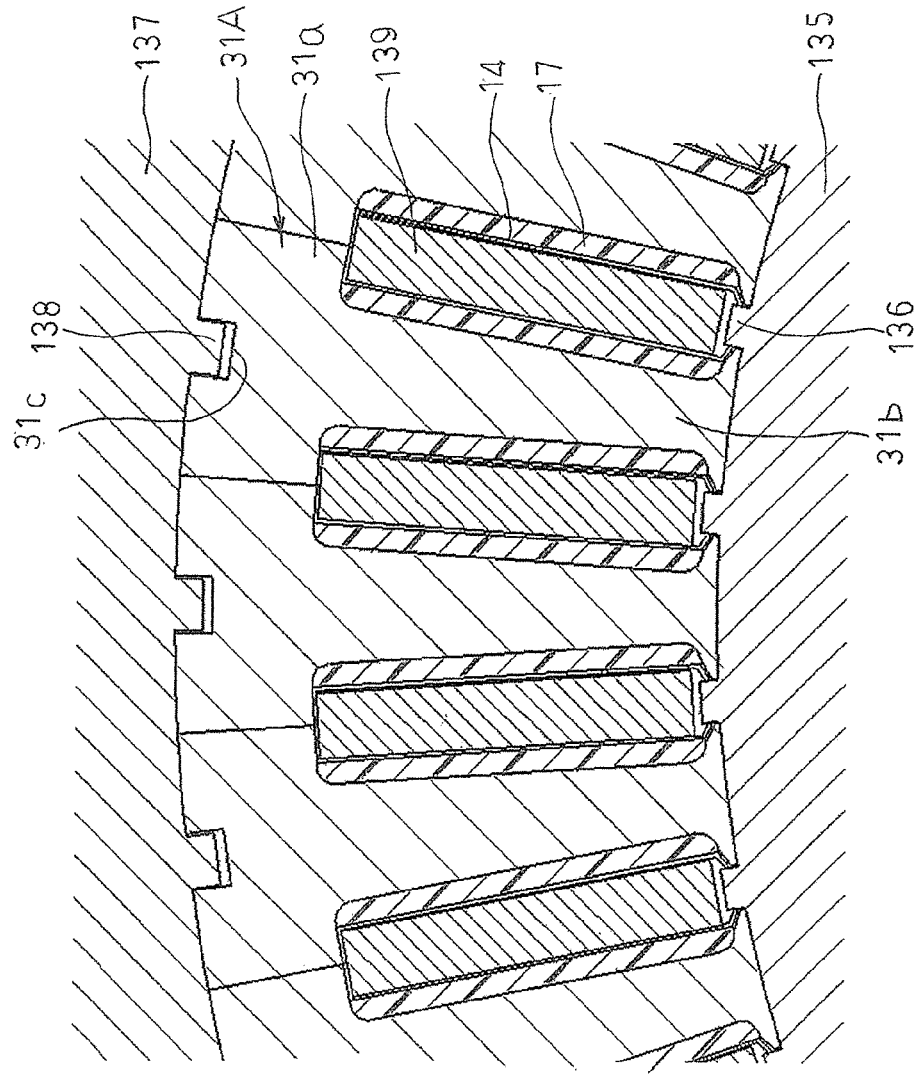
FIG. 74 is a partial cross section that shows the state in which the electrically insulating member pressing members are mounted in the laminated core manufacturing method according to Embodiment 10 of the present invention.

FIG. 71 is an end elevation that shows a state in which core segments are disposed in a single circular shape in ring members in a laminated core manufacturing method according to Embodiment 10 of the present invention, FIG. 72 is an oblique projection that explains a step of mounting an electrically insulating member pressing member in the laminated core manufacturing method according to Embodiment 10 of the present invention, FIG. 73 is an oblique projection that shows a state in which electrically insulating member pressing members are mounted in the laminated core manufacturing method according to Embodiment 10 of the present invention, and FIG. 74 is a partial cross section that shows the state in which the electrically insulating member pressing members are mounted in the laminated core manufacturing method according to Embodiment 10 of the present invention.

In Embodiment 10, a core segment 31A is used in which an interfitting indented portion 31c is formed on an outside diameter portion of the core back portion 31a of the core segment 31 from Embodiment 1 above. As shown in FIG. 71, the core segments 31A are aligned in a single circular shape by butting together the circumferential side surfaces of the core back portions 31a between an inner circumferential ring 135 and an outer circumferential ring 137 that are disposed coaxially (laminated body aligning step).

The inner circumferential ring 135 is formed so as to have an outside diameter that is equal to an inside diameter of the core segments 31A that are aligned in the single circular shape. As shown in FIG. 74, first positioning projections 136 are formed at a uniform angular pitch on an outer circumferential surface of the inner circumferential ring 135. The first positioning projections 136 are fitted between tip portions of the tooth portions 31b of the circumferentially adjacent core segments 31A. The outer circumferential ring 137 is formed so as to have an inside diameter that is equal to an outside diameter of the core segments 31A that are aligned in the single circular shape. As shown in FIG. 74, second positioning projections 138 are formed at a uniform angular pitch on an inner circumferential surface of the outer circumferential ring 137. The second positioning projections 138 are fitted into the respective interfitting indented portions 31c that are formed on the outside diameter portions of the core back portions 31a of the core segments 31A. Circumferential movement of the core segments 31A that are aligned in the single circular shape is thereby restricted. Radial movement of the core segments 31A that are aligned in the single circular shape is restricted by the inner circumferential ring 135 and the outer circumferential ring 137.

Next, electrically insulating members 14 to which an adhesive 17 has been applied are inserted from an axial direction between the tooth portions 31b of the circumferentially adjacent core segments 31A. The electrically insulating members 14 are disposed such that the surface to which the adhesive 17 has been applied lies alongside side surfaces of the tooth portions 31b of the core segments 31A, and are affixed thereto (electrically insulating member affixing step). Next, as shown in FIG. 72, electrically insulating member pressing members 139 are inserted between circumferentially adjacent electrically insulating members 14 from the axial direction. The electrically insulating members 14 are pressed onto the side surfaces of the tooth portions 31b thereby (electrically insulating member pressing step). As shown in FIGS. 70 and 73, the adhesive 17 is then cured in a state in which the electrically insulating member pressing members 139 are inserted between each of the insulating members 14 (bonding step). After the adhesive 17 has cured, the core segments 31A to which the electrically insulating members 14 are fixed are extracted to obtain a laminated core.

According to Embodiment 10, because the electrically insulating members 14 are fixed adhesively to the core segments 31A that are arranged in the single circular shape, dimensional precision of a stator core that is produced by arranging the laminated core that are manufactured in this manner into an annular shape is stabilized. Irregularities in radial dimensions of the stator core are also reduced, and roundness of the stator core is also improved.

Because the core segments can be manufactured using one type of jig that includes the inner circumferential ring and the outer circumferential ring, the number of jigs can be reduced and productivity can also be improved, regardless of the number of segments into which the stator core is divided in the circumferential direction.

Moreover, in Embodiment 10 above, a case in which the laminated core from Embodiment 1 is manufactured has been explained, but this configuration can also be applied to cases in which laminated cores according to other embodiments are manufactured.

Now, in each of the above embodiments, electrically insulating members and tooth portions are joined using an adhesive, but the bonding agent that joins together the electrically insulating members and the tooth portions is not limited to an adhesive, and may be a pressure-sensitive adhesive, or an adhesive and a pressure-sensitive adhesive may be used in combination. The bonding agent mounting step according to the present invention includes at least one step from among: a step of applying an adhesive to at least one of the electrically insulating members and the tooth portions, and a step of affixing a pressure-sensitive adhesive to at least one of the electrically insulating members and the tooth portions.

If a pressure-sensitive adhesive is used as the bonding agent, then time required for bonding can be shortened because the electrically insulating members and the tooth portions can be joined by the pressure-sensitive adhesive without changes in state, enabling productivity to be improved.

If an adhesive and a pressure-sensitive adhesive are used in combination as the bonding agent, then improvements in productivity due to using the pressure-sensitive adhesive and improvements in strength due to using the adhesive can both be effectively achieved. In that case, an adhesive that has properties of both pressure adhesion and thermosetting should be used as the bonding agent, the electrically insulating members and the core segments being fixed temporarily by pressure adhesion, and then the adhesive being cured by applying heat. A pressure-sensitive adhesive and an adhesive may alternatively be used, the electrically insulating members and the core segments being fixed temporarily by the pressure-sensitive adhesive, and then the adhesive being impregnated between the electrically insulating members and the core segments and cured.

EXPLANATION OF NUMBERING

14 ELECTRICALLY INSULATING MEMBER; 14d PROTRUDING PORTION; 14e ROOT PORTION; 17 ADHESIVE (BONDING AGENT); 17a ADHESIVE BASE PORTION (BONDING AGENT BASE PORTION); 17b HOOK PORTION; 31, 31A, 40, 70, 120, 123, 125 CORE SEGMENT (LAMINATED BODY); 31a, 40a, 120a, 123a, 125a CORE BACK PORTION; 31b, 40b, 120b, 123b, 125b TOOTH PORTION; 32, 121, 124, 126 CORE STRIP; 41 FIRST CORE STRIP; 41c FIRST INDENTED PORTION; 42 SECOND CORE STRIP; 42c SECOND INDENTED PORTION; 71 CORE BLOCK; 71a CORE BACK PORTION; 71b TOOTH PORTION; 128 HOLDING STRIP; 132 ELECTRICALLY INSULATING MEMBER PRESSING PORTION; 135 INNER CIRCUMFERENTIAL RING; 137 OUTER CIRCUMFERENTIAL RING; 139 ELECTRICALLY INSULATING MEMBER PRESSING MEMBER.

The invention claimed is:
1. A laminated core manufacturing method being a manufacturing method for a laminated core including, a laminated body that is made of a magnetic material, said laminated body including core back portions, and tooth portions that protrude radially inward from an inner circumferential surface of respective core back portions, and electrically insulating members that are disposed on two circumferential side portions of said tooth portions, wherein said laminated core manufacturing method comprises:
 a punching step in which core strips are punched out of a strip-shaped body of magnetic material;
 an aligning step in which said punched core strips are aligned while being laminated to form said laminated body;
 a bonding agent application step in which at least one of an adhesive and a pressure-sensitive adhesive are applied only to two circumferential side surfaces of each of said tooth portions of said laminated body, after said aligning step;
 an electrically insulating member affixing step in which said insulating members are affixed to said two side surfaces of each of said tooth portions, said insulating members cover each of said two circumferential side surfaces of said tooth portions and protrude outward at two axial ends of said tooth portions, after the bonding agent application step; and
 a bonding step in which said insulating members are pressed onto said two side surfaces of each of said tooth portions of said laminated body so as to integrate said laminated body and also so as to fix said insulating members to said laminated body, by means of at least one of said adhesive and said pressure-sensitive adhesive that are disposed between said two side surfaces of each of said tooth portions and said insulating members.

2. A laminated core manufacturing method being a manufacturing method for a laminated core including, a laminated body that is made of a magnetic material, said laminated body including core back portions, and tooth portions that protrude radially inward from an inner circumferential surface of respective core back portions, and electrically insulating members that are disposed on two circumferential side portions of said tooth portions, wherein said laminated core manufacturing method comprises:
 a punching step in which core strips are punched out of a strip-shaped body of magnetic material;
 an aligning step in which said punched core strips are aligned while being laminated to form said laminated body;
 a bonding agent application step in which at least one of an adhesive and a pressure-sensitive adhesive are applied only to said insulating members;
 an electrically insulating member affixing step in which said insulating members are affixed to two circumferential side surfaces of each of said tooth portions and protrude outward at two axial ends of said tooth portions after the bonding agent application step; and
 a bonding step in which said insulating members are pressed onto said two side surfaces of each of said tooth portions of said laminated body so as to integrate said laminated body and also so as to fix said insulating members to said laminated body, by means of at least one of said adhesive and said pressure-sensitive adhesive that are disposed between said two side surfaces of each of said tooth portions and said insulating members.

3. A laminated core manufacturing method being a manufacturing method for a laminated core comprising:
 a laminated body made of a magnetic material, said laminated body comprising:
  core back portions; and
  tooth portions that protrude radially inward from an inner circumferential surface of said core back portion; and
 electrically insulating members that are disposed on two circumferential side portions of said tooth portions,
 wherein said laminated core manufacturing method comprises:
 a punching step in which core strips are punched out of a strip-shaped body of magnetic material;
 an aligning step in which said punched core strips are aligned while being laminated to form said laminated body;
 a bonding agent application step in which an adhesive that comprises a base resin and a hardening accelerator is used, said base resin being applied only to a first portion of either the two circumferential side surfaces of each of said tooth portions or said insulating members, said hardening accelerator being applied only to a second portion of the other of said two circumferential side surfaces of each of said tooth portions or said insulating members;
 an electrically insulating member affixing step in which said insulating members are affixed to said two side surfaces of each of said tooth portions; and
 a bonding step in which said insulating members are pressed onto said two side surfaces of each of said tooth portions of said laminated body so as to integrate said laminated body and also so as to fix said insulating members to said laminated body, by means of said adhesive that is disposed between said two side surfaces of each of said tooth portions and said insulating members.

4. The laminated core manufacturing method according to claim 1, wherein:
 crimping portions are formed on said core strips in said punching step; and
 said core strips are held in a laminated state by fitting said crimping portions together in said aligning step.

5. The laminated core manufacturing method according to claim 4, wherein said crimping portions are formed on portions of said core strips that constitute said core back portion when laminated.

6. The laminated core manufacturing method according to claim 4, wherein:
 said core strips comprise attitude holding portions that protrude radially outward from portions that constitute said core back portion when laminated, said crimping portions being formed on said attitude holding portions; and
 said laminated core manufacturing method further comprises, after said bonding step, a step of removing said attitude holding portions that are held in a laminated state by fitting said crimping portions together.

7. The laminated core manufacturing method according to claim 1, wherein:
 holding strips that interfit with portions of said core strips that constitute said core back portion when laminated and on which crimping portions are formed are punched out in said punching step;
 said core strips and said holding strips are laminated in an interfitted state and said holding strips are held in a laminated state by fitting said crimping portions together in said aligning step; and said laminated core manufacturing method further comprises, after said bonding step, a step of removing said holding strips that are held in said laminated state by fitting said crimping portions together.

8. The laminated core manufacturing method according to claim 1, wherein:
said insulating members to which at least one of said adhesive and said pressure-sensitive adhesive has been applied are supplied continuously to said laminated body while moving said laminated body in a direction of lamination such that said insulating members are affixed to said two side surfaces of each of said tooth portions in said electrically insulating member affixing step,
said insulating members that move in said direction of lamination together with said laminated body being pressed against said two side surfaces of each of said tooth portions of said laminated body by an electrically insulating member pressing portion in said bonding step.

9. The laminated core manufacturing method according to claim 1, comprising, before said bonding step:
a laminated body aligning step in which said laminated bodies are aligned in a single circular shape between an inner circumferential ring and an outer circumferential ring that are disposed so as to be coaxial; and
an electrically insulating member pressing step in which electrically insulating member pressing members are inserted between said tooth portions of adjacent laminated bodies among said laminated bodies that are aligned in said single circular shape to press said electrically insulating members onto said two side surfaces of each of said tooth portions.

10. The laminated core manufacturing method according to claim 1, wherein said adhesive is an anaerobic adhesive.

11. The laminated core manufacturing method according to claim 1, wherein said adhesive is a thermosetting adhesive.

12. The laminated core manufacturing method according to claim 1, wherein said adhesive is a thermoplastic adhesive.

13. The laminated core manufacturing method according to claim 1, wherein said adhesive is an adhesive in sheet form.

14. The laminated core manufacturing method according to claim 1, wherein said adhesive comprises:
a first adhesive; and
a second adhesive that has a lower viscosity than said first adhesive,
said second adhesive being adjusted to a viscosity that can impregnate between said core strips of said laminated body.

15. The laminated core manufacturing method according to claim 1, wherein:
in said bonding step, a bonding agent base portion is disposed between each of said two side surfaces of each of said tooth portions and said insulating members so as to integrate said laminated body and also to fix said insulating members to said laminated body, and
forming hook portions that protrude in a direction of lamination at two circumferential edge portions at two end surfaces of each of said tooth portions to restrict axial movement of said core strips.

16. The laminated core manufacturing method according to claim 2, wherein:
in said bonding step, a bonding agent base portion is disposed between each of said two side surfaces of each of said tooth portions and said insulating members so as to integrate said laminated body and also to fix said insulating members to said laminated body, and
forming hook portions that protrude in a direction of lamination at two circumferential edge portions at two end surfaces of each of said tooth portions to restrict axial movement of said core strips.

17. The laminated core manufacturing method according to claim 3, wherein:
said insulating members cover each of said two circumferential side surfaces of said tooth portions and protrude outward at two axial ends of said tooth portion, and in said bonding step, a bonding agent base portion is disposed between each of said two side surfaces of each of said tooth portions and said insulating members so as to integrate said laminated body and also to fix said insulating members to said laminated body, and forming hook portions that protrude in a direction of lamination at two circumferential edge portions at two end surfaces of each of said tooth portions to restrict axial movement of said core strips.

18. The laminated core manufacturing method according to claim 1, wherein in said bonding agent application step, at least one of said adhesive and said pressure-sensitive adhesive are applied to all of said core strips at each of said two circumferential side surfaces of each of said tooth portions and are connected from one end to the other end of each of said two circumferential side surfaces of each of said tooth portions in a direction of lamination.

* * * * *